(12) United States Patent
Fujita et al.

(10) Patent No.: US 10,533,846 B2
(45) Date of Patent: Jan. 14, 2020

(54) IMAGE GENERATION DEVICE, IMAGE GENERATING METHOD, AND PATTERN LIGHT GENERATION DEVICE

(71) Applicant: Mitsubishi Electric Corporation, Tokyo (JP)

(72) Inventors: Takeo Fujita, Tokyo (JP); Koichi Yamashita, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 285 days.

(21) Appl. No.: 15/572,918

(22) PCT Filed: Nov. 16, 2015

(86) PCT No.: PCT/JP2015/082065
§ 371 (c)(1),
(2) Date: Nov. 9, 2017

(87) PCT Pub. No.: WO2016/199323
PCT Pub. Date: Dec. 15, 2016

(65) Prior Publication Data
US 2018/0106606 A1    Apr. 19, 2018

(30) Foreign Application Priority Data
Jun. 9, 2015 (JP) .................. 2015-116631

(51) Int. Cl.
*G01B 11/25* (2006.01)
*G06T 7/521* (2017.01)
(Continued)

(52) U.S. Cl.
CPC .............. *G01B 11/25* (2013.01); *G01B 11/00* (2013.01); *G01C 3/06* (2013.01); *G01S 17/48* (2013.01);
(Continued)

(58) Field of Classification Search
CPC ......... G01B 11/25; G01B 11/00; G06T 7/521; G01C 3/06; G01S 17/48; G01S 17/89; G01S 17/92
(Continued)

(56) References Cited

U.S. PATENT DOCUMENTS

2007/0008597 A1  1/2007  Watanabe et al.
2007/0216894 A1  9/2007  Garcia et al.
(Continued)

FOREIGN PATENT DOCUMENTS

JP          6-87377 A    3/1994
JP       2007-17643 A    1/2007
(Continued)

*Primary Examiner* — Sath V Perungavoor
*Assistant Examiner* — Kristin Dobbs
(74) *Attorney, Agent, or Firm* — Birch, Stewart, Kolasch & Birch, LLP

(57) ABSTRACT

An image generation device includes an imaging unit 11, a projection unit 22, and a distance information generation unit 18, and a projection pattern includes unit patterns arranged in a plurality of rows in a first direction and in a plurality of columns in a second direction. A plurality of light dots include first dots and second dots which are light dots of different states from each other; the unit patterns arranged in the first direction have the light dot arrangements identical with each other; the unit patterns arranged in the second direction have light dot arrangements different from each other; the number of first dots among a plurality of light dots arranged in the first direction in each of the unit patterns is the same fixed number in each row in the second direction; and in a location other than the unit pattern, the number of first dots included in a row of the same length as the unit pattern in the second direction differs from the fixed number, in a certain row in the second direction.

10 Claims, 15 Drawing Sheets

(51) Int. Cl.
  *G01S 17/48* (2006.01)
  *G01C 3/06* (2006.01)
  *G01S 17/93* (2006.01)
  *G01B 11/00* (2006.01)
  *G01S 17/89* (2006.01)

(52) U.S. Cl.
  CPC ............. *G01S 17/89* (2013.01); *G01S 17/93* (2013.01); *G06T 7/521* (2017.01); *G01S 17/936* (2013.01)

(58) Field of Classification Search
  USPC ........................................................ 348/136
  See application file for complete search history.

(56) References Cited

U.S. PATENT DOCUMENTS

| | | |
|---|---|---|
| 2015/0204657 A1 | 7/2015 | Fujita et al. |
| 2015/0253123 A1 | 9/2015 | Braker et al. |

FOREIGN PATENT DOCUMENTS

| | | |
|---|---|---|
| JP | 2009-528514 A | 8/2009 |
| JP | 2010-101683 A | 5/2010 |
| JP | 2014-85282 A | 5/2014 |
| WO | WO 2014/011179 A1 | 1/2014 |
| WO | WO 2014/080937 A1 | 5/2014 |

| 0 | 0 | 1 | 1 | 1 | 0 | 1 | 0 | 0 | 0 | 1 | 1 | 0 | 1 | 1 | 0 |
|---|---|---|---|---|---|---|---|---|---|---|---|---|---|---|---|
| 1 | 1 | 0 | 0 | 0 | 0 | 1 | 1 | 1 | 0 | 1 | 0 | 0 | 0 | 1 | 1 |
| 0 | 1 | 0 | 1 | 1 | 1 | 0 | 0 | 0 | 1 | 0 | 1 | 1 | 1 | 0 | 0 |
| 1 | 0 | 1 | 0 | 0 | 1 | 0 | 1 | 1 | 1 | 0 | 0 | 1 | 0 | 0 | 1 |
| 0 | 0 | 1 | 1 | 1 | 0 | 1 | 0 | 0 | 0 | 1 | 1 | 0 | 1 | 1 | 0 |
| 1 | 1 | 0 | 0 | 0 | 0 | 1 | 1 | 1 | 0 | 1 | 0 | 0 | 0 | 1 | 1 |
| 0 | 1 | 0 | 1 | 1 | 1 | 0 | 0 | 0 | 1 | 0 | 1 | 1 | 1 | 0 | 0 |
| 1 | 0 | 1 | 0 | 0 | 1 | 0 | 1 | 1 | 1 | 0 | 0 | 1 | 0 | 0 | 1 |
| 0 | 0 | 1 | 1 | 1 | 0 | 1 | 0 | 0 | 0 | 1 | 1 | 0 | 1 | 1 | 0 |
| 1 | 1 | 0 | 0 | 0 | 0 | 1 | 1 | 1 | 0 | 1 | 0 | 0 | 0 | 1 | 1 |
| 0 | 1 | 0 | 1 | 1 | 1 | 0 | 0 | 0 | 1 | 0 | 1 | 1 | 1 | 0 | 0 |
| 1 | 0 | 1 | 0 | 0 | 1 | 0 | 1 | 1 | 1 | 0 | 0 | 1 | 0 | 0 | 1 |

HORIZONTAL DIRECTION

VERTICAL DIRECTION

FIG.12(a)

| 0 | 1 | 0 | 1 | 1 | 0 | 1 | 0 |
|---|---|---|---|---|---|---|---|
| 1 | 1 | 0 | 0 | 1 | 1 | 0 | 0 |
| 0 | 0 | 0 | 0 | 0 | 0 | 1 | 1 |
| 0 | 1 | 1 | 0 | 0 | 0 | 0 | 1 |
| 0 | 1 | 0 | 1 | 1 | 0 | 1 | 0 |
| 1 | 0 | 1 | 0 | 0 | 1 | 0 | 0 |
| 1 | 0 | 0 | 1 | 0 | 0 | 1 | 1 |
| 0 | 1 | 1 | 0 | 0 | 1 | 0 | 1 |

FIG.12(b)

| 0 | 1 | 0 | 1 | 1 | 0 | 1 | 0 |
|---|---|---|---|---|---|---|---|
| 1 | 1 | 0 | 0 | 1 | 1 | 0 | 0 |
| 0 | 0 | 0 | 0 | 0 | 0 | 1 | 1 |
| 0 | 1 | 1 | 0 | 0 | 0 | 0 | 1 |
| 0 | 1 | 0 | 1 | 1 | 0 | 1 | 0 |
| 1 | 0 | 1 | 0 | 0 | 1 | 0 | 0 |
| 1 | 0 | 0 | 1 | 0 | 0 | 1 | 1 |
| 0 | 1 | 1 | 0 | 0 | 1 | 0 | 1 |

FIG.12(c)

| 0 | 1 | 0 | 1 | 1 | 0 | 1 | 0 |
|---|---|---|---|---|---|---|---|
| 1 | 1 | 0 | 0 | 1 | 1 | 0 | 0 |
| 0 | 0 | 0 | 0 | 0 | 0 | 1 | 1 |
| 0 | 1 | 1 | 0 | 0 | 0 | 0 | 1 |
| 0 | 1 | 0 | 1 | 1 | 0 | 1 | 0 |
| 1 | 0 | 1 | 0 | 0 | 1 | 0 | 0 |
| 1 | 0 | 0 | 1 | 0 | 0 | 1 | 1 |
| 0 | 1 | 1 | 0 | 0 | 1 | 0 | 1 |

FIG.12(d)

| 0 | 1 | 0 | 1 | 1 | 0 | 1 | 0 |
|---|---|---|---|---|---|---|---|
| 1 | 1 | 0 | 1 | 0 | 1 | 0 | 0 |
| 0 | 0 | 0 | 0 | 0 | 0 | 1 | 1 |
| 0 | 1 | 1 | 0 | 0 | 1 | 0 | 1 |
| 0 | 1 | 0 | 1 | 1 | 0 | 1 | 0 |
| 1 | 0 | 1 | 0 | 1 | 1 | 0 | 0 |
| 1 | 0 | 0 | 1 | 0 | 0 | 1 | 1 |
| 0 | 1 | 1 | 0 | 0 | 1 | 0 | 1 |

UNIT PATTERN BOUNDARY POSITION

BOUNDARY POSITION OF UNIT PATTERN

UNIT PATTERN

FIG.14

| No.1 | No.2 | No.3 | No.4 | No.5 |
|---|---|---|---|---|
| 0 1 1 0<br>1 0 0 1<br>0 0 1 1<br>1 1 0 0 | 1 0 1 0<br>0 1 1 0<br>1 0 0 1<br>0 1 0 1 | 0 0 1 1<br>0 1 0 1<br>1 1 0 0<br>1 0 1 0 | 1 0 0 1<br>1 1 0 0<br>0 0 1 1<br>0 1 1 0 | 0 1 1 0<br>1 0 0 1<br>1 0 1 0<br>0 1 0 1 |

| No.6 | No.7 | No.8 | No.9 | No.10 |
|---|---|---|---|---|
| 0 0 1 1<br>1 1 0 0<br>0 1 0 1<br>1 0 1 0 | 1 0 1 0<br>0 1 0 1<br>1 1 0 0<br>0 0 1 1 | 0 0 1 1<br>1 1 0 0<br>1 0 1 0<br>0 1 0 1 | 1 1 0 0<br>1 0 0 1<br>0 0 1 1<br>0 1 1 0 | 0 1 0 1<br>0 1 1 0<br>1 0 1 0<br>1 0 0 1 |

| No.11 | No.12 | No.13 | No.14 | No.15 |
|---|---|---|---|---|
| 1 0 1 0<br>1 1 0 0<br>0 0 1 1<br>0 1 0 1 | 0 0 1 1<br>1 0 0 1<br>1 1 0 0<br>0 1 1 0 | 1 0 1 0<br>0 1 1 0<br>0 1 0 1<br>1 0 0 1 | 0 1 0 1<br>0 0 1 1<br>1 0 1 0<br>1 1 0 0 | 0 1 1 0<br>1 0 1 0<br>0 1 0 1<br>1 0 0 1 |

| No.16 | No.17 | No.18 | No.19 | |
|---|---|---|---|---|
| 0 0 1 1<br>1 1 0 0<br>1 0 0 1<br>0 1 1 0 | 1 0 1 0<br>1 0 0 1<br>0 1 1 0<br>0 1 0 1 | 1 1 0 0<br>0 0 1 1<br>1 0 0 1<br>0 1 1 0 | 1 0 0 1<br>0 1 1 0<br>0 1 1 0<br>1 0 0 1 | |

| No.18r | No.17r | No.16r | No.15r | No.14r |
|---|---|---|---|---|
| 0 1 1 0<br>1 0 0 1<br>1 1 0 0<br>0 0 1 1 | 1 0 1 0<br>0 1 1 0<br>1 0 0 1<br>0 1 0 1 | 0 1 1 0<br>1 0 0 1<br>0 0 1 1<br>1 1 0 0 | 1 0 0 1<br>1 0 1 0<br>0 1 0 1<br>0 1 1 0 | 0 0 1 1<br>0 1 0 1<br>1 1 0 0<br>1 0 1 0 |

| No.13r | No.12r | No.11r | No.10r | No.9r |
|---|---|---|---|---|
| 1 0 0 1<br>1 0 1 0<br>0 1 1 0<br>0 1 0 1 | 0 1 1 0<br>0 0 1 1<br>1 0 0 1<br>1 1 0 0 | 1 0 1 0<br>1 1 0 0<br>0 0 1 1<br>0 1 0 1 | 1 0 0 1<br>0 1 0 1<br>0 1 1 0<br>1 0 1 0 | 0 1 1 0<br>1 1 0 0<br>1 0 0 1<br>0 0 1 1 |

| No.8r | No.7r | No.6r | No.5r | No.4r |
|---|---|---|---|---|
| 1 0 1 0<br>0 1 0 1<br>0 0 1 1<br>1 1 0 0 | 1 1 0 0<br>0 0 1 1<br>1 0 1 0<br>0 1 0 1 | 0 1 0 1<br>1 0 1 0<br>0 0 1 1<br>1 1 0 0 | 1 0 1 0<br>0 1 0 1<br>1 0 0 1<br>0 1 1 0 | 0 1 1 0<br>1 1 0 0<br>0 0 1 1<br>1 0 0 1 |

| No.3r | No.2r | No.1r | | |
|---|---|---|---|---|
| 0 1 0 1<br>0 0 1 1<br>1 0 1 0<br>1 1 0 0 | 1 0 1 0<br>1 0 0 1<br>0 1 1 0<br>0 1 0 1 | 0 0 1 1<br>1 1 0 0<br>1 0 0 1<br>0 1 1 0 | | |

IMAGE GENERATION DEVICE, IMAGE GENERATING METHOD, AND PATTERN LIGHT GENERATION DEVICE

TECHNICAL FIELD

The present invention relates to an image generation device, an image generating method, and a pattern light generation device that acquire distance information indicating a distance to an object (an object to be imaged) that exists in a space (an imaging space) captured by an imaging unit, in association with a captured image (an imaging signal) generated by the imaging unit.

BACKGROUND ART

Conventionally, there is known a vehicle environment monitoring device that includes: an imaging device that captures an image of a monitoring region; a light projector that radiates pattern light (a bright spot pattern) in the monitoring region; a data processing unit that detects existence of an obstacle or the like by processing image data of reflected light of the pattern light generated by an imaging device; and a switching means that displays the obstacle or the like detected by a data processing unit on a display device, instead of a state of the monitoring region, when an illumination intensity around a vehicle is equal to or lower than a predetermined value (for example, refer to patent reference 1).

Moreover, a method that enables optical distance measurement is proposed. For example, this method includes: a step of projecting a primary speckle pattern from a lighting assembly into a target region; a step of capturing a plurality of reference images of the primary speckle pattern; a step of capturing a test image of the primary speckle pattern projected on a surface of an object in the target region; a step of comparing the test image with the reference images in order to identify the reference image that includes the primary speckle pattern that matches most closely the primary speckle pattern in the test image; and a step of estimating the position of the object on the basis of the distance of the identified reference image from the lighting assembly (for example, refer to patent reference 2).

However, in the above conventional device and method, it is necessary to perform computation for calculating a correlation value by pattern matching between a captured image and a plurality of reference images, and there is a problem that the computation amount of this computation is large.

Hence, there is proposed a method in which a quadrangle pattern with four linked light dots, that is, a light spot appears periodically in projected pattern light, and the light spot is distinguished from other light spots by a combination of illumination and non-illumination of light dots around the light spot (for example, refer to patent reference 3).

PRIOR ART REFERENCE

Patent Reference

PATENT REFERENCE 1: Japanese Patent Application Publication No. 6-87377 (for example, claims 1 and 2)
PATENT REFERENCE 2: Japanese Patent Application Publication No. 2009-528514 (for example, claim 1, paragraphs 0001, 0006, and 0007)
PATENT REFERENCE 3: International Publication WO 2014/080937
PATENT REFERENCE 4: Japanese Patent Application Publication No. 2007-17643 (paragraphs 0003 and 0004)

SUMMARY OF THE INVENTION

Problem to be Solved by the Invention

However, a light projector that projects pattern light by a combination of a diffraction grating and laser light does not change the size of a projected light dot according to the distance to an object, but increases the distance between light dots in proportion to the distance to the object. Hence, when the distance to the object is far, the light dot on a captured image becomes smaller, and it is possible that the figure of the light dot is formed between a pixel and a pixel of an image sensor and is lost from the captured image.

Moreover, a light dot is erroneously detected to be projected to a position to which the light dot is not projected actually, due to noise that occurs in the image sensor, in some cases.

When the loss or erroneous detection of the light dot such as the above occurs, it is concerned that a light spot, which is a quadrangle pattern with four linked light dots, cannot be recognized as a light spot or is erroneously recognized as another light spot.

The present invention is made to solve the above problem of the conventional technology, and its purpose is to provide an image generation device, an image generating method, and a pattern light generation device that can restore a light dot from surrounding light dots even when the loss or the erroneous detection of the light dot occurs, and can acquire information on a distance to an object in association with an imaging signal generated by an imaging unit.

Means of Solving the Problem

An image generation device of the present invention includes an imaging unit configured to generate an imaging signal by capturing an image of an imaging space; a projection unit configured to form a projection pattern as a projection image on an object that exists in the imaging space, by projecting pattern light toward the imaging space; a separation unit configured to generate an image signal of a background component that does not include a component of the projection pattern and an image signal of a projection image component, from the imaging signal generated when the pattern light is not projected and the imaging signal generated when the pattern light is projected; and a distance information generation unit configured to store in advance a relationship between a position of each of light dots in the projection pattern and a projection angle, and generate distance information indicating a distance to the object on which the light dots are projected, by identifying a projection angle of each of light dots in the projection pattern captured by the imaging unit on a basis of the relationship between the position of each of the light dots in the projection pattern and the projection angle and the image signal of the projection image component and calculating the distance on a basis of the identified projection angles. The projection pattern includes a plurality of unit patterns arranged in a plurality of rows in a first direction and a plurality of columns in a second direction orthogonal to the first direction, the plurality of light dots include first dots and second dots, and the first dots and the second dots are light dots in different states from each other, the plurality of unit patterns arranged in the first direction have light dot arrangements identical with each other, the plurality of unit patterns arranged in the second direction have light dot arrangements different from each other, in each of the plurality of unit patterns, a number of the first dots among a plurality of light dots arranged in the first direction is a fixed number that is a same number in each row in the second direction, and in a location other than the unit pattern, a number of the first dots included in a row of a same length as the unit pattern in the second direction differs from the fixed number, in a certain row in the second direction.

Effects of the Invention

According to the present invention, the number of first dots (for example, illuminated dots) included within the width of a unit pattern in a first direction (vertical direction) is set to a fixed number (first fixed number), and thus, even when an illuminated dot is lost or even when noise is erroneously detected as an illuminated dot, it is possible to determine the validity of pattern information from an arrangement of light dots in the vertical direction and modify the error of the light dot. Thus, it is possible to acquire the accurate information on the distance to the object, even when the object is far.

Moreover, according to the present invention, the counted value of the number of first dots (for example, illuminated dots) included within the width of the unit pattern in a second direction (horizontal direction) becomes a fixed number (second fixed number) at all lines (rows), only when counted between the boundaries of unit patterns, and thus it is possible to estimate the boundaries in the horizontal direction of the unit patterns from the arrangement of the light dots and to identify the unit patterns, without providing a distinct pattern boundary identification code. Thus, it is possible to identify the unit patterns accurately and to acquire the accurate information on the distance to the object.

BRIEF DESCRIPTION OF THE DRAWINGS

FIGS. 12(*a*) to 12(*d*) are diagrams illustrating a validity determination method and a modification method of a pattern of the light dots.

FIG. 14 is a diagram illustrating a plurality of reference unit patterns stored in advance in an identification code read unit or a memory unit of FIG. 11 in association with pattern numbers which are information for identifying them.

FIG. 19 is a diagram illustrating a plurality of reference unit patterns stored in advance in an identification code read unit or a memory unit of an image generation device according to the second embodiment in association with pattern numbers which are information for identifying them.

MODE FOR CARRYING OUT THE INVENTION

First Embodiment

Figure 1:
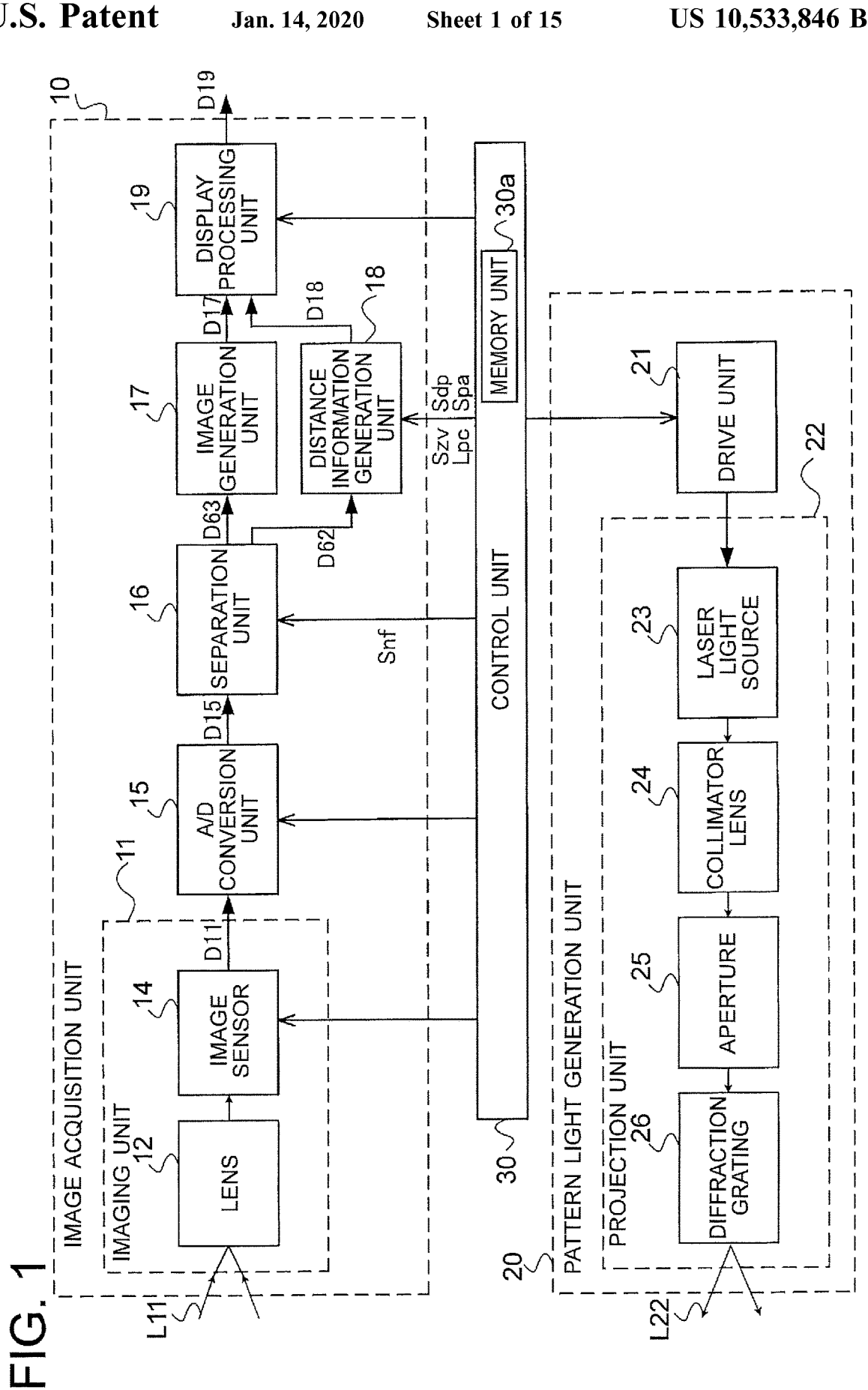
FIG. 1 is a block diagram schematically illustrating a configuration of an image generation device according to a first embodiment of the present invention.

FIG. 1 is a block diagram schematically illustrating a configuration of an image generation device according to a first embodiment of the present invention. The image generation device of FIG. 1 is a device that can perform an image generating method according to the first embodiment. As illustrated in FIG. 1, the image generation device according to the first embodiment includes an image acquisition unit 10, a pattern light generation unit (a pattern light generation device) 20, and a control unit 30. The image acquisition unit 10 includes an imaging unit 11, an A/D (analog-digital) conversion unit 15, a separation unit 16, an image generation unit 17, a distance information generation unit 18, and a display processing unit 19. The imaging unit 11 includes a lens 12 and an image sensor 14. The pattern light generation unit 20 includes a projection unit 22 and a drive unit 21. The projection unit 22 includes a laser light source 23, a collimator lens 24, an aperture 25, and a diffraction grating 26. The control unit 30 includes a memory unit 30*a*. The memory unit 30*a* may be provided outside the control unit 30. Note that the configuration of the image generation device to which the present invention is applied is not limited to that illustrated in FIG. 1.

Figure 2:
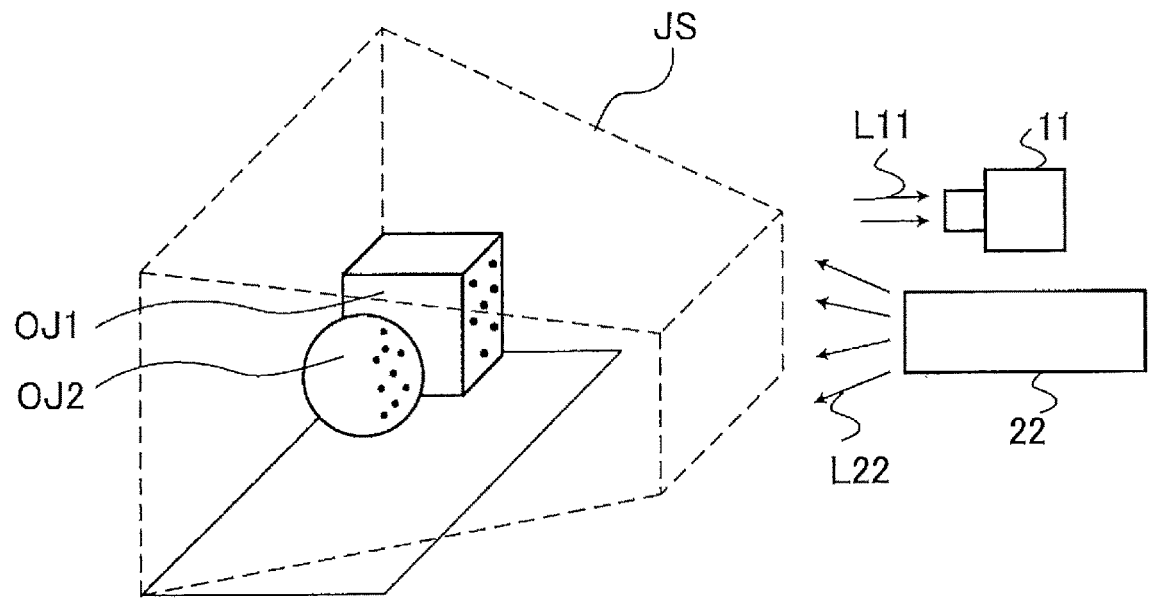
FIG. 2 is a diagram schematically illustrating a projection unit and an imaging unit of the image generation device according to the first embodiment and an imaging space captured by the imaging unit.

FIG. 2 is a diagram schematically illustrating the projection unit 22 and the imaging unit 11 of the image generation device according to the first embodiment, and an imaging space (imaging target space) JS captured by the imaging unit 11. FIG. 2 illustrates a case in which a rectangular parallelepiped object OJ1 and a spherical object OJ2 exist as imaging target objects in the imaging space JS. As illustrated in FIG. 2, the imaging unit 11 captures an image of the objects OJ1 and OJ2, by receiving light L11 reflected by the objects OJ1 and OJ2 that exist in the imaging space JS. The image generation device not only generates an imaging signal (image signal) D17 as image information by the imaging by the imaging unit 11, but also generates distance information D18 indicating a distance from the imaging unit 11 to each part of the objects OJ1 and OJ2 on the basis of this imaging signal, and outputs a signal that associates the imaging signal D17 with the distance information D18 mutually. Note that the number and the shapes of objects are not limited to the example of FIG. 2. Moreover, the shape of the imaging space JS is not limited to the example of FIG. 2.

As illustrated in FIG. 2, the projection unit 22 projects pattern light L22 for generating a projection pattern as a projection image toward the imaging space JS. In the example illustrated in FIG. 2, the projection pattern includes a plurality of grid points (a plurality of light dots, that is, light dots of a plurality of rows and a plurality of columns) arranged in a matrix form, that is, in a horizontal direction (lateral direction) and a vertical direction (perpendicular direction). The projection pattern includes a plurality of unit patterns (illustrated in FIG. 14 described later) arranged in a plurality of rows in a first direction and a plurality of columns in a second direction orthogonal to the first direction. The plurality of light dots are composed of first dots and second dots, and the first dots and the second dots are light dots in different states from each other. For example, the first dots are light dots of high brightness, and the second dots are light dots of lower brightness than the first dots. In general, the first dot is an illuminated dot as a light dot at a position formed by being irradiated with a light beam emitted from the projection unit 22, and the second dot is a non-illuminated dot as a light dot at a position which is not irradiated with the light beam. As described above, the projection pattern is composed of the plurality of light dots arranged in the matrix form, and the plurality of light dots are composed of the illuminated dots and non-illuminated dots generally. A plurality of unit patterns arranged in the first direction have light dot arrangements that are identical with each other. A plurality of unit patterns arranged in the second direction have light dot arrangements that are different from each other. In each of the plurality of unit patterns, the number of first dots included in the plurality of light dots arranged in the first direction is a fixed number and the same in every row in the second direction. In a location other than the unit patterns, the number of first dots included in a row of the same length as the unit pattern in the second direction differs from the fixed number, in a certain row in the second direction.

Figure 3:
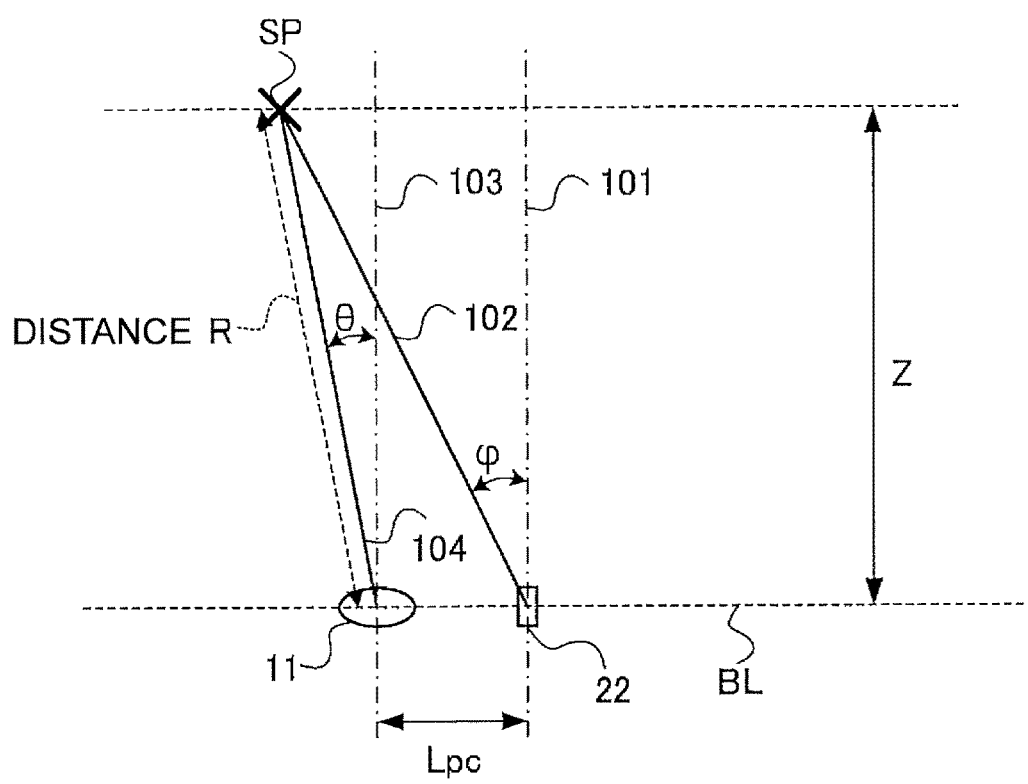
FIG. 3 is a diagram illustrating a positional relationship between the projection unit and the imaging unit of the image generation device according to the first embodiment and a light dot for composing a projection pattern generated by projection of pattern light.

FIG. 3 is a diagram illustrating a state, seen from above, of the imaging unit 11 and the projection unit 22 of the image generation device according to the first embodiment and one light dot (a grid point as a light dot position in the matrix form) SP formed at an arbitrary point on the object OJ1 or OJ2 in the imaging space JS. In the example of FIG. 3, the imaging unit 11 and the projection unit 22 are arranged separated by a distance Lpc in the horizontal direction (the lateral direction in FIG. 3). The straight line that passes through the imaging unit 11 and the projection unit 22 is referred to as a base line BL, and the distance Lpc is referred to as a base line length.

A case will be described in which a light dot SP is formed on the object OJ1 or OJ2 in the imaging space JS by a light beam (a part of the pattern light L22) projected from the projection unit 22, and a light beam reflected at this light dot SP is received by the imaging unit 11. In this case, if a projection angle φ of the light beam that proceeds from the projection unit 22 toward the light dot SP, an incident angle θ of the light beam that proceeds from the light dot SP toward the imaging unit 11, and the base line length Lpc are known, a distance Z from the base line BL to the light dot SP on the object OJ1 or OJ2 can be calculated by calculation based on the principle of triangulation. As illustrated in FIG. 3, the projection angle φ is an angle formed between a straight line 101 orthogonal to the base line BL and a straight line 102 that links the projection unit 22 and the light dot SP, in a plane (a virtual plane) that includes the base line BL and the light dot SP. Moreover, as illustrated in FIG. 3, the incident angle θ is an angle formed between a straight line 103 orthogonal to the base line BL and a straight line 104 that links the imaging unit 11 and the light dot SP in the plane that includes the base line BL and the light dot SP.

The incident angle θ of the light beam (the straight line 104) that proceeds from the light dot SP toward the imaging unit 11 can be calculated on the basis of which position on an imaging surface of the image sensor 14 of the imaging unit 11 the figure of the light dot SP is formed at, a direction of an axis line of the image sensor 14 (direction in which the imaging surface of the image sensor 14 is directed), and a view angle of the image sensor. The projection angle φ of the light beam (the straight line 102) that proceeds from the projection unit 22 toward the light dot SP is predetermined by the configuration of the projection unit 22, and thus is already known.

When the projection unit 22 emits a plurality of light beams of projection angles that are different from each other to project a plurality of light dots as a projection pattern and the imaging unit 11 captures an image of the plurality of light dots, if the projection angles are known, the projection angle of each of the plurality of light dots is estimated on the basis of a mutual relationship between the positions of the plurality of light dots on the image on the imaging surface of the image sensor 14. In this case, if the following projection incidence condition (A1) is satisfied, the projection angle of each of the plurality of light dots captured by the imaging unit 11 is found.

The projection incidence condition (A1) is "a size relationship between the projection angles of a plurality of light dots projected from the projection unit 22 (for example, the order of the plurality of light dots when the plurality of light dots are arranged in ascending order from the smallest projection angle) is the same as a size relationship between the incident angles of a plurality of light dots captured by the imaging unit 11 (for example, the order of the plurality of light dots when the plurality of light dots are arranged in ascending order from the smallest incident angle)".

In a case where the projection incidence condition (A1) is not satisfied, or in a case where it is uncertain whether or not the projection incidence condition (A1) is satisfied, it is necessary to estimate the projection angle of each of the light dots in the captured image, by pattern matching with the captured image (reference unit pattern) of the projection pattern measured in advance with respect to an object located at a predetermined distance. However, the computation amount needed for the pattern matching process is significantly large.

Even in a case where the projection incidence condition (A1) is not satisfied, or even in a case where it is uncertain whether or not the projection incidence condition (A1) is satisfied, the image generation device according to the first embodiment can estimate accurately the projection angle of each of the plurality of light dots captured by the imaging unit 11 with a small computation amount.

With respect to a size relationship of angles (projection angles) in the vertical direction with respect to a plurality of light dots projected at different angles (projection angles) from each other on a plane (a virtual plane) orthogonal to the base line BL, the projection incidence condition (A1) is always satisfied. Hence, in this case, "switching" of the order does not need to be considered.

In the following, a case will be described in which the base line BL is a straight line that extends in the horizontal direction (the lateral direction in FIG. 3), and a plurality of light dots generated by the pattern light L22 are arranged in the matrix form in the horizontal direction and the vertical direction (the direction orthogonal to a paper surface on which FIG. 3 is depicted).

Figure 4:
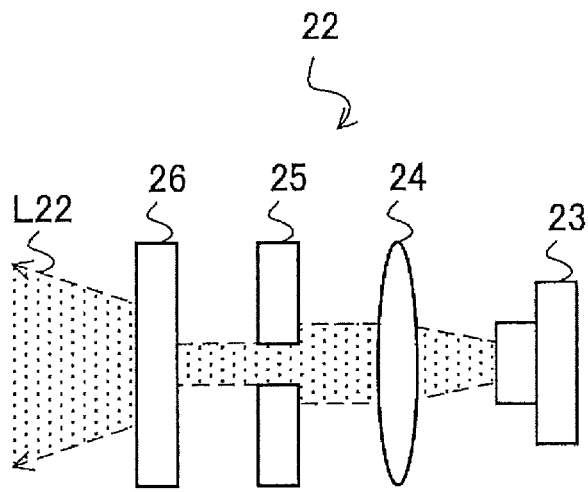
FIG. 4 is a diagram schematically illustrating a configuration example of the projection unit of FIG. 1.

FIG. 4 is a diagram schematically illustrating a configuration example of the projection unit 22 of FIG. 1. The drive unit 21 of the pattern light generation unit 20 is controlled by the control unit 30, and causes the laser light source 23 to emit light. As illustrated in FIGS. 1 and 4, laser light emitted from the laser light source 23 is transformed into parallel light by the collimator lens 24, and the beam diameter of the parallel light is changed by the aperture 25 to a predetermined diameter. The diffraction grating 26 projects the pattern light L22 for generating a predetermined projection pattern toward the imaging space JS.

Moreover, as illustrated in FIG. 1, the lens 12 of the imaging unit 11 causes an object image to focus on the imaging surface of the image sensor 14. The image sensor 14 generates an imaging signal D11 by photoelectrically converting the incident image, and outputs this imaging signal D11. The imaging unit 11 captures the image of the objects OJ1 and OJ2 that exist in the imaging space JS. This imaging is performed at a predetermined frame frequency, and a plurality of continuous frame images (frame images generated at frame cycle intervals) is obtained by this imaging.

When the pattern light L22 is projected on the objects OJ1 and OJ2, the imaging unit 11 outputs the imaging signal D11 indicating an image in which the figure (projection image component) of the projection pattern generated on the objects OJ1 and OJ2 by the projection of the pattern light L22 is superimposed on the original light from the objects OJ1 and OJ2 toward the imaging unit 11 (a background component which is a component at the time when the pattern light L22 is not projected).

The A/D conversion unit 15 converts the imaging signal D11 output from the image sensor 14, to a digital imaging signal D15 of 8 bits (256 gradations), for example. The separation unit 16 receives the output of the A/D conversion unit 15, that is, the digital imaging signal D15, and separates the digital imaging signal D15 into the projection image component and the background component. The image generation unit 17 generates the image signal D17 of the background component from an image signal D63 of the background component output from the separation unit 16. The distance information generation unit 18 generates a signal D18 indicating the distance information, from an image signal D62 of the projection image component output from the separation unit 16.

The display processing unit 19 outputs a display signal D19 for allowing an image of the background component generated by the image generation unit 17 to be displayed in association with the distance information generated by the distance information generation unit 18. The signal D19 output from the display processing unit 19 and indicating the image with which the distance information is associated is output to another device (for example, a display device or the like).

The control unit 30 controls the pattern light generation unit 20 and the image acquisition unit 10. For example, the control unit 30 controls an imaging mode, a frame rate, a light exposure time, and so on in the image sensor 14 of the imaging unit 11, and sets an image display mode, a distance information display mode, and so on to the display processing unit 19. Moreover, the control unit 30 supplies a signal for controlling operation timing to the A/D conversion unit 15. Further, the control unit 30 sets operation modes of the pattern light generation unit 20 and the image acquisition unit 10.

Further, the control unit 30 retains, in the memory unit 30a, information Sdp indicating a relationship between positions in the projection pattern, of the unit patterns (illustrated in FIG. 14 described later) composed of the light dots included in the projection pattern projected from the projection unit 22, information Spa indicating a correspondence relationship between positions on the projection pattern and projection angles, information Szv indicating the axis line direction and the view angle of the imaging unit 11, and information indicating the base line length Lpc, and supplies these pieces of information to the distance information generation unit 18.

Moreover, the control unit 30 performs control for synchronizing operation of the pattern light generation unit 20 and operation of the image acquisition unit 10. Specifically, the control unit 30 controls the imaging unit 11 so as to repeat the imaging at a predetermined frame frequency, and controls the drive unit 21 so that the laser light source 23 alternately repeats a light-emitting state and a non-light-emitting state in a frame-by-frame manner. Further, the control unit 30 supplies, to the separation unit 16, a signal Snf indicating whether the laser light source 23 is in the light-emitting state or in the non-light-emitting state.

The frame frequency of the imaging unit 11 is 30 fps for example, and the imaging signal D11 indicating an image of one frame is output from the imaging unit 11 in each frame cycle (each time a predetermined time elapses). Timing of the imaging of each frame is controlled by the control unit 30.

The laser light source 23 of the projection unit 22 is alternately switched between the light-emitting state and the non-light-emitting state in a frame-by-frame manner; thus the projection unit 22 is alternately switched between a state of projecting the pattern light L22 to the imaging space JS and a state of not projecting the pattern light L22 in a frame-by-frame manner; and the imaging unit 11 acquires an image at the time when the pattern light L22 is projected and an image at the time when the pattern light L22 is not projected, alternately in a frame-by-frame manner.

The separation unit 16 generates the image signal (projection image component) of the pattern light L22 and the image signal (background component) excluding the pattern light L22 component, on the basis of the image at the time when the pattern light L22 is projected and the image at the time when the pattern light L22 is not projected. That is, the separation unit 16 outputs, as the background component, the image obtained during a frame period during which the pattern light L22 is not projected, and outputs, as the projection image component, the image obtained by subtracting the image obtained during the frame period during which the pattern light L22 is not projected, from the image obtained during a frame period during which the pattern light L22 is projected, among two frame periods that are temporally contiguous.

Figure 5:
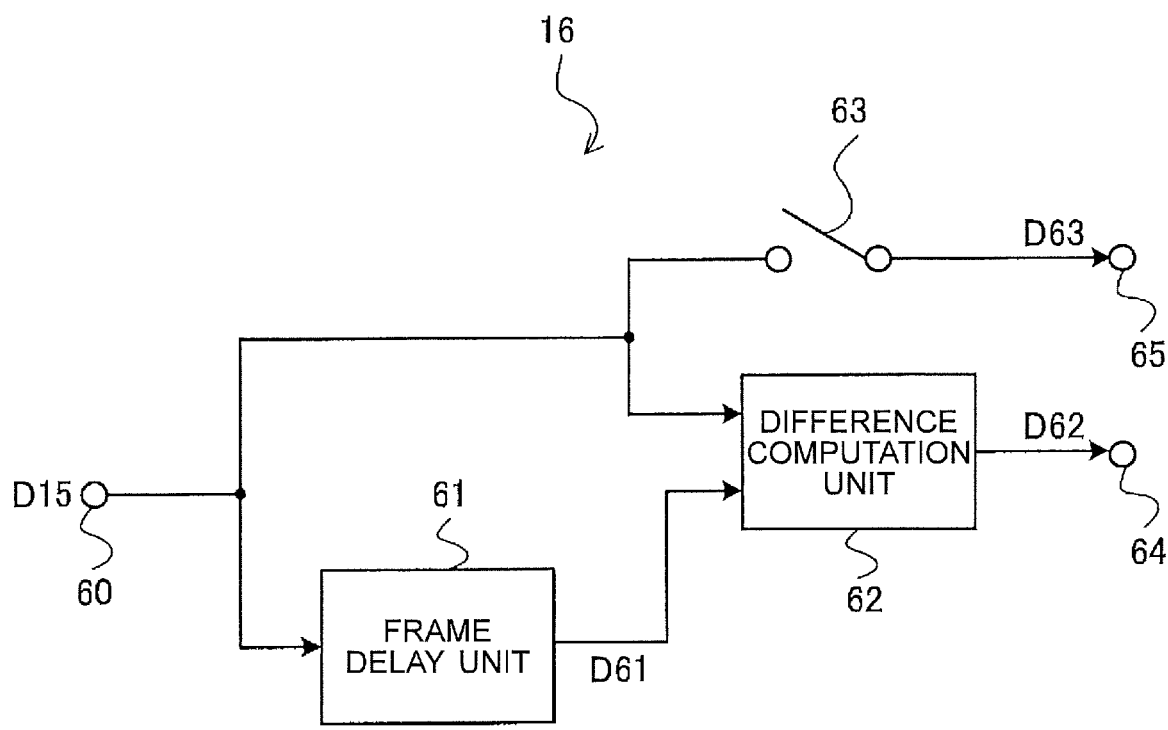
FIG. 5 is a block diagram schematically illustrating a configuration example of a separation unit of FIG. 1.

FIG. 5 is a block diagram schematically illustrating a configuration example of the separation unit 16 of FIG. 1. As illustrated in FIG. 5, the output (digital imaging signal) D15 of the A/D conversion unit 15 is supplied to an input terminal 60. The frame delay unit 61 delays the digital imaging signal D15 supplied to the input terminal 60 by one frame period, and outputs an imaging signal D61 delayed by one frame.

The difference computation unit 62 calculates the difference between the imaging signal D15 and the imaging signal D61 delayed by one frame. This difference is obtained by subtracting the imaging signal of the frame generated by the imaging performed when the pattern light L22 is not projected, from the imaging signal of the frame generated by the imaging performed when the pattern light L22 is projected. The difference signal D62 indicating this difference is supplied to the distance information generation unit 18 via an output terminal 64 as the projection image component.

A switch 63 closes at a timing when the imaging signal D15 of the frame generated by the imaging performed when the projection unit 22 does not project the pattern light L22 is supplied to the input terminal 60, and supplies the imaging signal D15 at this time to the image generation unit 17 via an output terminal 65 as the background component D63.

Figure 6:
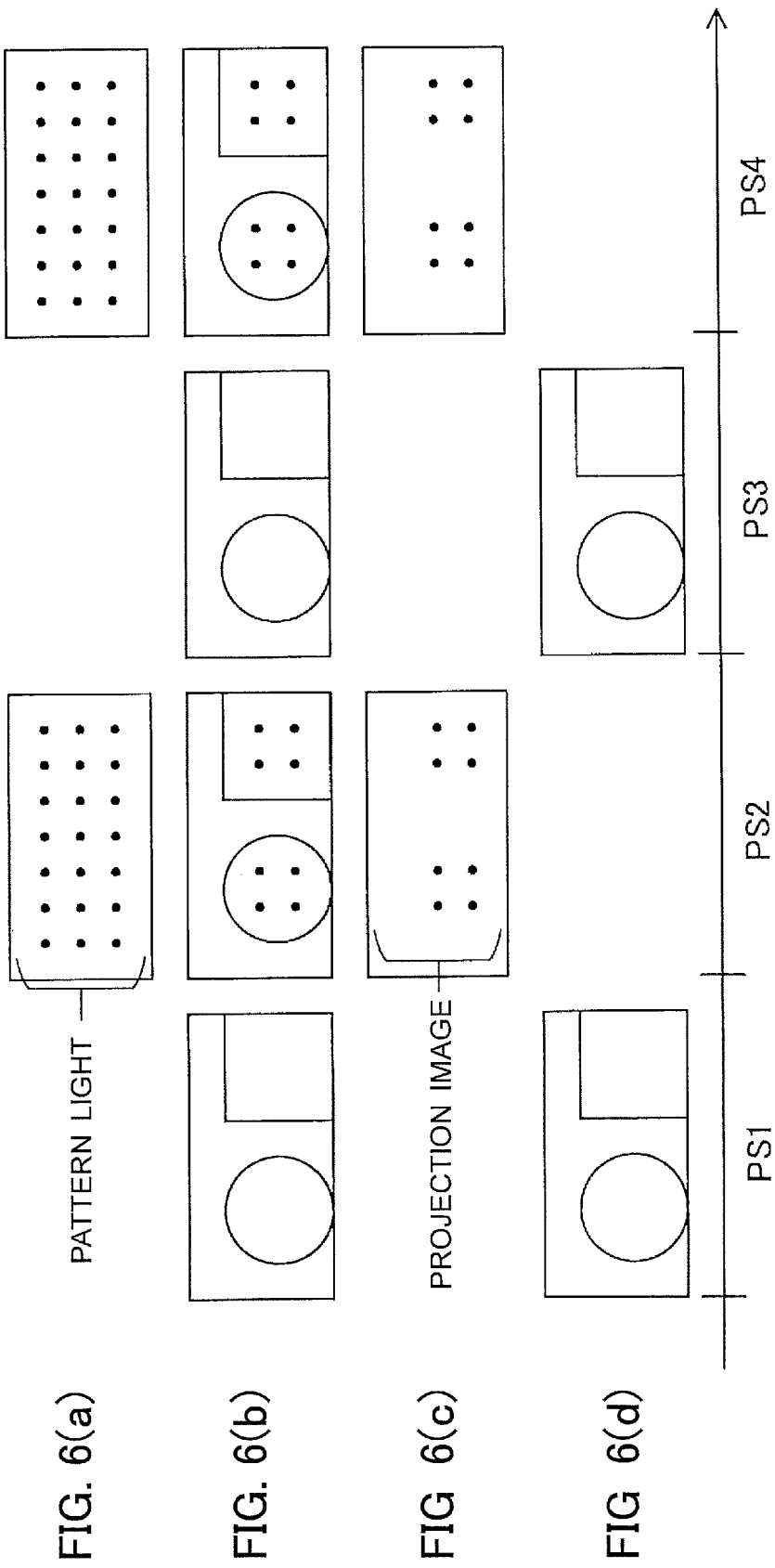
FIGS. 6(*a*) to 6(*d*) are diagrams illustrating operation of the separation unit of FIG. 5.

FIGS. 6(a) to 6(d) illustrate an example of operation of the separation unit 16. In this example, the pattern light L22 is not projected in a first frame PS1 and a third frame PS3, and the pattern light L22 is projected in a second frame PS2 and a fourth frame PS4, as illustrated in FIG. 6(a). As a result, the captured images illustrated in FIG. 6(b) are obtained during respective frame periods.

In the first frame PS1, the switch 63 is closed, and the imaging signal D15 at that time (the imaging signal D15 in the first frame PS1, that is, the signal D15 obtained by performing the analog to digital conversion of the output D11 of the imaging unit 11 in a state in which the pattern light L22 is not projected) is supplied from the output terminal 65 to the image generation unit 17 as the background component D63 (FIG. 6(d)), and is supplied to the frame delay unit 61.

In the second frame PS2, the difference computation unit 62 subtracts the output D61 of the frame delay unit 61 (the imaging signal of the first frame PS1) from the imaging signal D15 at that time (the imaging signal D15 in the second frame PS2, that is, the signal D15 obtained by performing the analog to digital conversion of the output D11 of the imaging unit 11 in a state in which the pattern light L22 is projected), and supplies the difference D62 obtained as the result of the subtraction as the projection image component from the output terminal 64 to the distance information generation unit 18 (FIG. 6(c)).

In the third frame PS3, in the same way as the first frame PS1, the switch 63 closes, and the imaging signal D15 at that time is supplied from the output terminal 65 to the image generation unit 105 as the background component D63, and is input into the frame delay unit 61.

In the fourth frame PS4, in the same way as the second frame PS2, the difference computation unit 62 subtracts the output D61 of the frame delay unit 61 from the imaging signal D15 at that time, and supplies the difference D62 obtained as the result of the subtraction from the output terminal 64 to the distance information generation unit 18 as the projection image component. In the following, the same process is repeated, and the image of the background component only and the image of the projection image component only are output alternately during each frame period.

The image generation unit 17 performs a gradation correction process, a noise reduction process, an outline correction process, a white balance adjustment process, a signal amplitude adjustment process, a color correction process, and the like, for the image signal D63 (FIG. 6(d)) composed of the background component output from the separation unit 16, and outputs an image signal obtained as a result of these processes, as the image signal D17 of the background image.

The distance information generation unit 18 generates information indicating the distance from the imaging unit 11 to each part of the projection image, on the basis of the image signal D62 (FIG. 6(c)) of the projection image component output from the separation unit 16 and the information on the projection pattern supplied from the control unit 30. The projection pattern that includes a code for identifying the position of the unit pattern is used for the purpose of generating the distance information in the distance information generation unit 18. Here, the projection pattern used in the first embodiment will be described, before the explanation of the operation of the distance information generation unit 18.

In the projection image (projection pattern) projected by the projection unit 22, a part of the grid points arranged in the matrix form as illustrated in FIGS. 2 and 6(a), that is, in the lateral direction (row direction) and the perpendicular direction (column direction) is projected as the illuminated dots, and the remaining grid points are projected as the non-illuminated dots. It is desirable that the projection image (projection pattern) projected by the projection unit 22 satisfy the following projection pattern conditions (B1) to (B5).

Projection pattern condition (B1): the projection pattern includes the plurality of unit patterns, and each of these plurality of unit patterns is formed by a rectangular region that includes a constant number of light dots (grid points in the matrix form) in the perpendicular direction and a constant number of light dots in the lateral direction (grid points in the matrix form).

Projection pattern condition (B2): in each of the plurality of unit patterns included in the projection pattern, the number of illuminated dots included in a line (column) in the perpendicular direction is a predetermined first fixed number (two in the first embodiment), and the number of illuminated dots included in a line (row) in the lateral direction is a predetermined second fixed number (two in the first embodiment).

Projection pattern condition (B3): when a region of the same number of dots (four dots in the first embodiment) as the unit pattern is cut out at a phase that differs from the cycle of the unit patterns (arrangement cycle) (a boundary position that differs from the boundaries of the unit patterns) in the projection pattern, the number of illuminated dots in the horizontal direction (lateral direction) included in this cut out region differs from the second fixed number which is the number of illuminated dots included in the unit pattern, in a certain line (row).

Projection pattern condition (B4): in the projection pattern, a plurality of unit patterns arranged in the vertical direction (perpendicular direction) are identical unit patterns with each other.

Projection pattern condition (B5): in the projection pattern, a plurality of unit patterns arranged in the horizontal direction (lateral direction) are different unit patterns from each other. The dot arrangement is decided so that each pattern is not identical with other patterns even if the readout position in the vertical direction differs.

In order to measure the distance to the object by using the captured image, it is necessary to identify which angle a part of the projection pattern that appears on the captured image is projected at from the projection unit 22. The projection pattern conditions (B1) to (B5) are the conditions necessary to identify which part a part of the projection pattern corresponds to in the entire projection pattern, from the part of the projection pattern. In the following, a specific identification method will be shown with an example of the projection pattern.

Figures 7, 8:
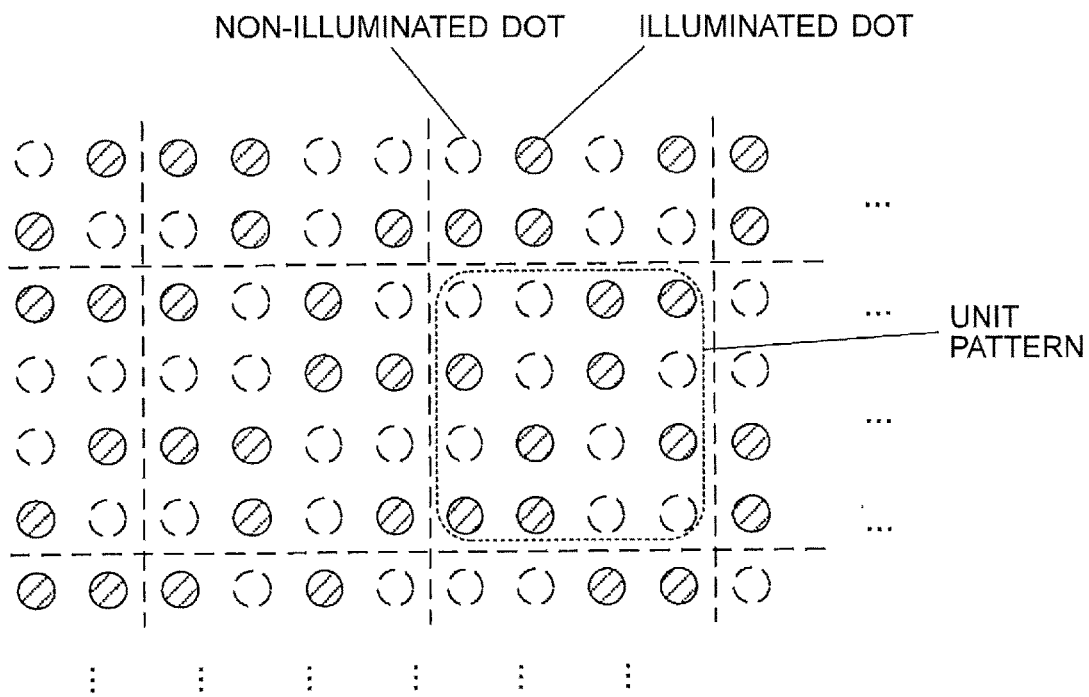
FIG. 7 is a diagram illustrating an example of a projection pattern which is a projection image of pattern light in the first embodiment.
FIG. 8 is a diagram illustrating an example of the projection pattern in the first embodiment, with "1" (an illuminated dot) and "0" (a non-illuminated dot).

FIG. 7 is a diagram illustrating an example of the projection pattern which is the projection image of the pattern light L22 in the first embodiment. Here, a case will be described in which the unit pattern is composed of light dots of four dots in the horizontal direction and four dots in the vertical direction. In FIG. 7, straight dotted lines in the horizontal direction and straight dotted lines in the vertical direction illustrate separations (boundaries) of the unit patterns. Sixteen grid points (light dot positions) exist in one unit pattern. In the first embodiment, the illuminated dots are the light dots projected on the object as a pattern, and the non-illuminated dots are the light dots (the grid point positions of the matrix) that are not projected on the object as the pattern.

FIG. 8 is a diagram illustrating an example of the projection pattern in the first embodiment with "1" (the illuminated dot) and "0" (the non-illuminated dot). The unit pattern in FIG. 8 is composed of light dots arranged in the matrix form of four dots in the horizontal direction and four dots in the vertical direction. In FIG. 8, solid straight lines in the horizontal direction and solid straight lines in the vertical direction illustrate separations (boundaries) of the unit patterns. As illustrated in FIG. 8, the plurality of unit patterns (four unit patterns in FIG. 8) arranged in the horizontal direction include light dot patterns that differ from each other. Moreover, as illustrated in FIG. 8, the plurality of unit patterns (three unit patterns in FIG. 8) arranged in the vertical direction include light dot patterns identical with each other. The reason why the unit patterns arranged in the horizontal direction differ from each other is to identify the boundaries of the unit patterns adjacent to each other and to identify the angles formed between the projection unit 22 and the unit patterns. Further, the reason why a plurality of unit patterns arranged in the vertical direction are identical with each other is so that, by causing the patterns of the light dots arranged in the vertical direction to have cyclicity, an error can be modified even when a light dot which is the non-illuminated dot actually is erroneously determined as the illuminated dot, due to loss of a light dot or influence of noise, at the time of reading the pattern.

Figure 9:
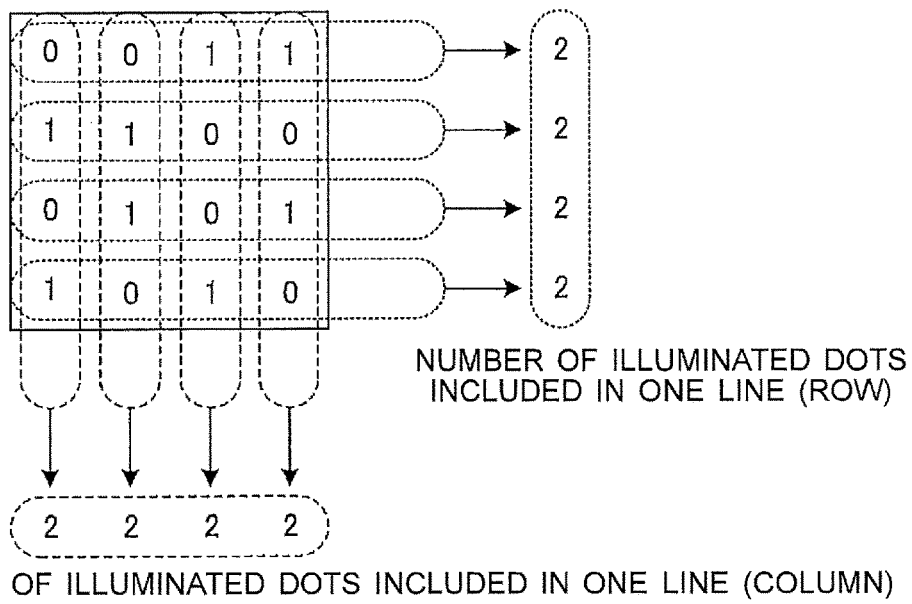
FIG. 9 is a diagram illustrating the number of illuminated dots included in one unit pattern in the projection pattern in the first embodiment, with respect to each row (horizontal line) and each column (vertical line).

FIG. 9 is a diagram illustrating the number of illuminated dots included in a unit pattern in each horizontal line (row) and in each vertical line (column). As illustrated in FIG. 9, in the unit pattern, the number of illuminated dots included in one line (row) in the horizontal direction is set constant (the second fixed number), and the number of illuminated dots included in one line (column) in the vertical direction is set constant (the first fixed number). In the example of FIG. 9, the unit pattern is set such that the number of illuminated dots included in one line (row) is a constant value "2" and that the number of illuminated dots included in one line (column) is a constant value "2", in the unit pattern of four dots in the horizontal direction and four dots in vertical direction.

Moreover, with respect to the arrangement of the unit patterns in the horizontal direction, the unit patterns are set such that, when a region of the same number of dots (four dots in the first embodiment) as the unit pattern is cut out at a phase that differs from the cycle of the unit patterns (i.e., when a region of the same number of dots as the unit pattern is cut out at a position other than the boundaries of the unit patterns), the number of illuminated dots in the horizontal direction included in the cut out region is not the second fixed number (two in the first embodiment) in the unit pattern, in a certain line (a certain line (row) among four lines (rows) in the first embodiment).

Figure 10:
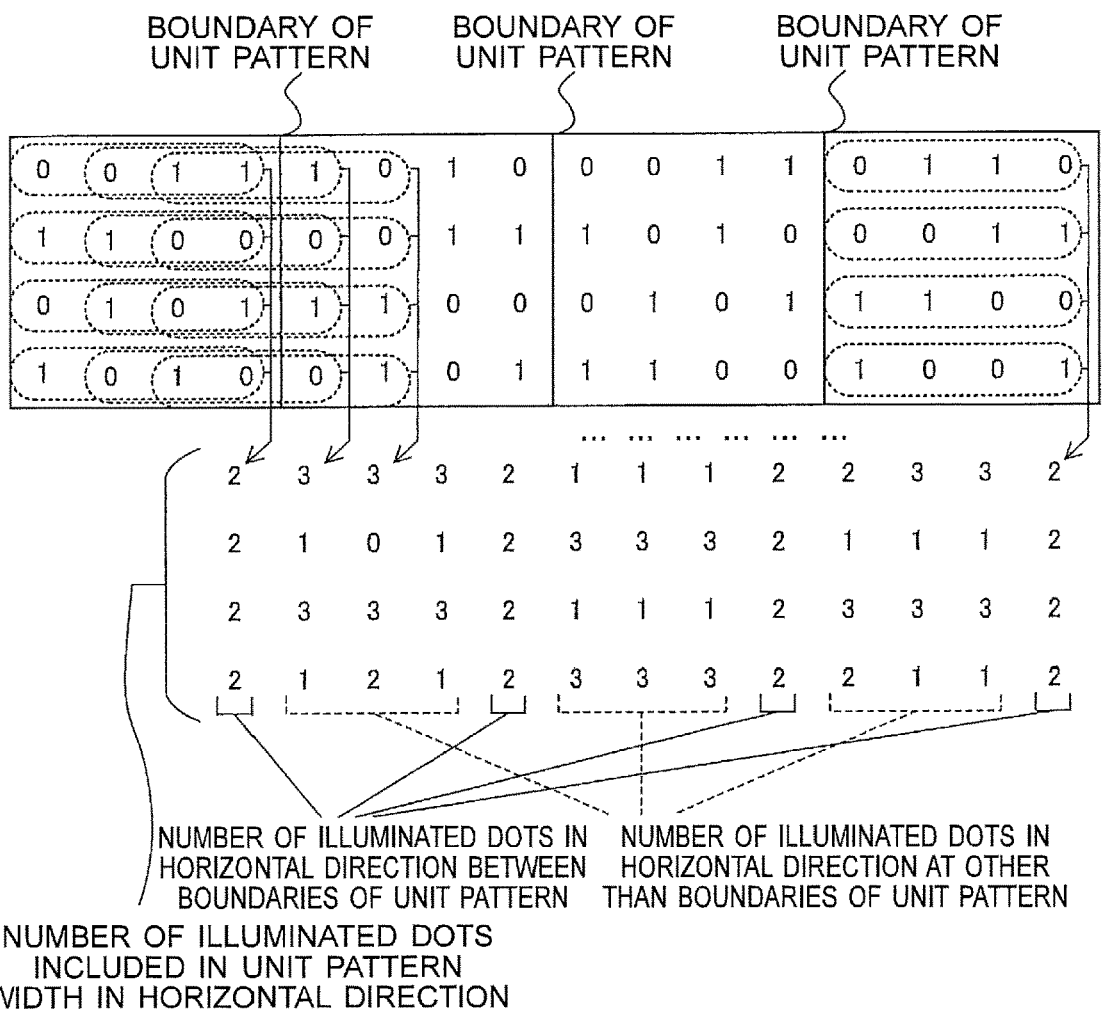
FIG. 10 is a diagram illustrating a condition to be satisfied when a plurality of unit patterns in the projection pattern in the first embodiment are arranged in a horizontal direction.

FIG. 10 is a diagram illustrating a condition to be satisfied when the plurality of unit patterns in the projection pattern in the first embodiment are arranged in the horizontal direction. FIG. 10 illustrates an example in which four different unit patterns are arranged in the horizontal direction, when the size of the unit pattern is four dots in the horizontal direction and four dots in the vertical direction. FIG. 10 illustrates the number of illuminated dots among four dots in the horizontal direction at each position in the horizontal direction, below the four unit patterns arranged in the horizontal direction. The unit pattern is determined such that the number of illuminated dots between the boundaries of the unit pattern is a constant number (in the example of FIG. 10, two, which is the second fixed number). Moreover, a combination of the unit patterns arranged in the horizontal direction is determined such that, when the number of illuminated dots among four dots in the horizontal direction is counted at a location other than the boundaries of the unit patterns, the number of illuminated dots differs from the constant number (in the example of FIG. 10, two, which is the second fixed number) which is the number of illuminated dots between the boundaries of the unit pattern, in at least one line among the counted values of four lines. Here, it is desirable that the number of illuminated dots among four dots in the horizontal direction at a location other than the boundaries of the unit patterns differ from the number of illuminated dots between the boundaries of the unit pattern in as many lines as possible. This is because errors in identifying the pattern position can be reduced much more when the above projection pattern conditions (B1) to (B5) are satisfied at the time of reading the pattern.

Figure 11:
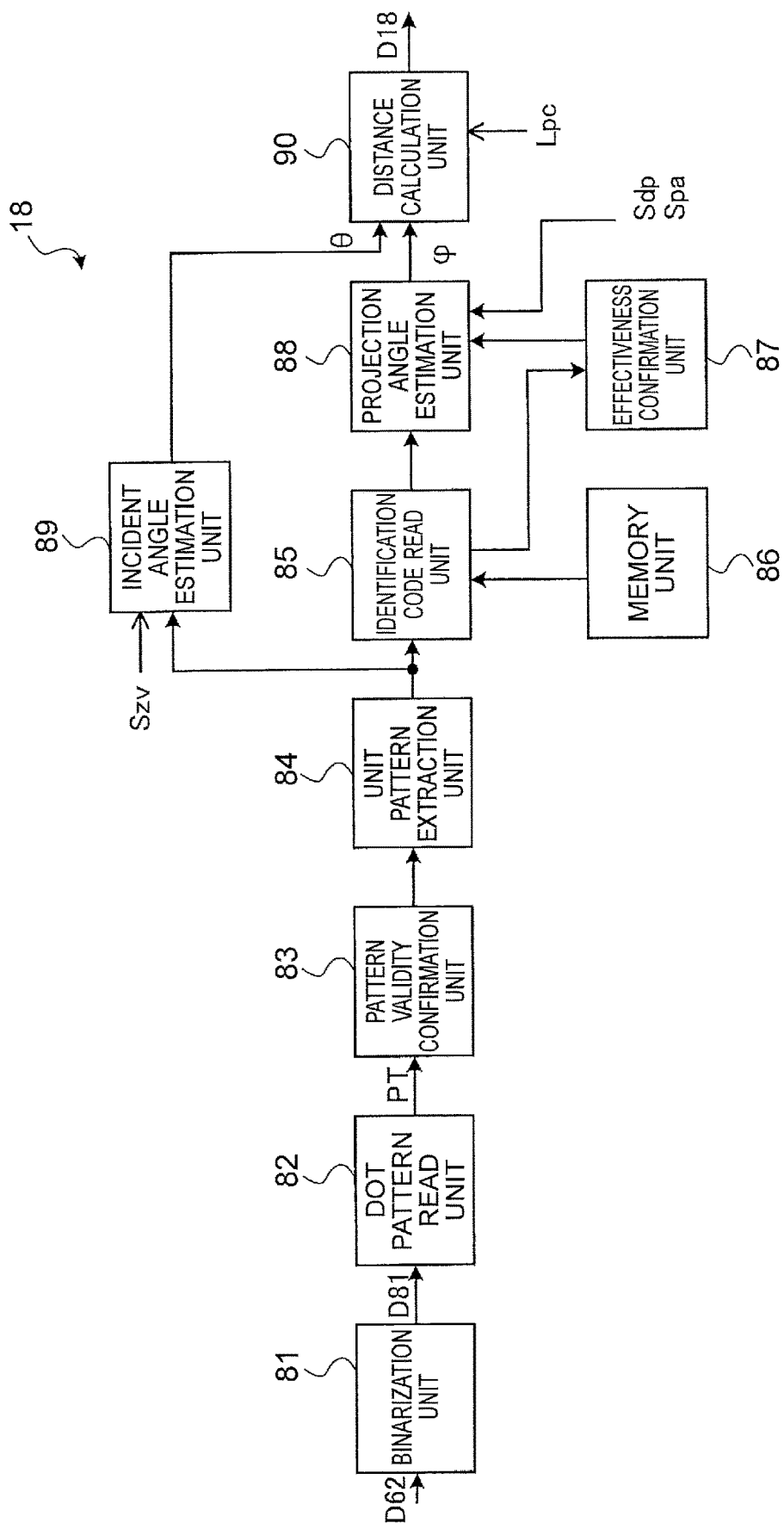
FIG. 11 is a block diagram schematically illustrating a configuration of a distance information generation unit of FIG. 1.

FIG. 11 is a block diagram schematically illustrating a configuration of the distance information generation unit 18 of FIG. 1. A pattern identification method will be described with reference to FIG. 11. As illustrated in FIG. 11, the distance information generation unit 18 includes a binarization unit 81, a dot pattern read unit 82, a pattern validity confirmation unit 83, a unit pattern extraction unit 84, an identification code read unit 85, a memory unit 86, an effectiveness confirmation unit 87, a projection angle estimation unit 88, an incident angle estimation unit 89, and a distance calculation unit 90.

The binarization unit 81 binarizes the image signal D62 of the projection image component output from the separation unit 16, and outputs a binary projection image signal D81.

The dot pattern read unit 82 estimates the interval of the grids in the lateral direction and the perpendicular direction at which the light dots are arranged, from the projection image signal D81, and reads the patterned arrangement of the light dots along the grid points, in which "1" indicates a case that a light dot existing on the grid point is the illuminated dot and "0" indicates a case that a light dot existing on the grid point is the non-illuminated dot, as pattern information PT composed of two-dimensionally arranged "1" and "0".

The pattern validity confirmation unit 83 confirms the pattern of the light dots in the vertical direction, and determines whether or not the pattern information PT generated by the dot pattern read unit 82 is valid, from the patterned arrangement of the light dots in the vertical direction. For example, the pattern validity confirmation unit 83 reads the light dots in a rectangular region of a size corresponding to two or more cycles of the unit patterns, in each of the vertical direction (first direction) and the horizontal direction (second direction), on the basis of the image signal of the projection image component, and determines whether a condition that states of light dots at positions separated by the distance of the length of the unit pattern in the first direction are identical with each other and a condition that the number of illuminated dots included in a column of the same length as the length of the unit pattern in the vertical direction (first direction) is the same as the number of illuminated dots included in a column in the first direction of the unit pattern are satisfied. The pattern validity confirmation unit 83 modifies the pattern of the light dots as necessary.

FIGS. 12(a) to 12(d) are diagrams illustrating a validity confirmation method and a modification method of the pattern validity confirmation unit 83. FIG. 12(a) illustrates the pattern information PT generated by the dot pattern read unit 82. Here, it is necessary to read at least the region corresponding to two cycles of the unit patterns in the vertical direction, in order to determine the validity and modify the pattern of the light dots. Here, the number of dots in the vertical direction of a unit pattern is four dots, and a region of eight dots in the vertical direction is read, in the illustrated case.

Information on positions separated by four dots which is a cycle pattern size in the vertical direction is compared, and FIG. 12(b) illustrates, with shade, extraction results of locations at which the information are not identical. Moreover, FIG. 12(c) illustrates, with shade, a result obtained by counting the number of illuminated dots among four dots in the vertical direction including the light dots illustrated with the shade in FIG. 12(b) and extracting the dots including a combination whose counted value is not two.

The extraction results in FIG. 12(b) and FIG. 12(c) illustrate the dots that have the possibility of read error on the basis of each determination method. The pattern information is modified, assuming that the dots included in both of the extraction results in FIG. 12(b) and FIG. 12(c) are the dots of the read error. The modification result is illustrated in FIG. 12(d). In FIG. 12(d), the dots in the shade regions surrounded by the squares are modified.

The pattern validity confirmation unit 83 again confirms whether validity conditions (C1) and (C2) described below are satisfied, with respect to the pattern information after the modification (for example, FIG. 12(d)).

(C1) The state of the light dot (the illuminated dot "1" or the non-illuminated dot "0") is identical in each cycle of the unit pattern in the vertical direction (at every four dots in the vertical direction in the first embodiment).

(C2) The number obtained by counting the number of illuminated dots in a region corresponding to one cycle of the unit pattern in the vertical direction is identical with the first fixed number (two in the first embodiment) which is the predetermined number of illuminated dots.

When a result of confirmation indicates that both of the validity conditions (C1) and (C2) are satisfied, the estimation of the projection angle and the calculation of the distance based on the read result are performed in the processing units of the subsequent stages (the processing units after the unit pattern extraction unit 84). Moreover, when the result of confirmation indicates that at least one of the validity conditions (C1) and (C2) is not satisfied, the estimation of the projection angle and the calculation of the distance based on the read result are not performed in the processing units of the subsequent stage.

Here, a case has been described in which the dot pattern that is referred to when the validity confirmation and the modification of the patterned arrangement of the light dots in the vertical direction are performed is two cycles (8 dots) of the unit patterns in the vertical direction, but the number of cycles of the patterns of the light dots that are referred to can be three cycles (12 dots) or more. The validity confirmation and the modification can be performed on the basis of more rules, by increasing the number of cycles of the patterns of the light dots that are referred to, and thus the proportion of correctable dots increases. For example, by referring to two cycles of the unit patterns, one erroneous dot per eight dots can be modified, so that the correction rate is 12.5%. In contrast, by referring to three cycles of the unit patterns, erroneous dots of not more than two dots per twelve dots can be modified, and the correction rate improves to 16.7%.

The unit pattern extraction unit 84 illustrated in FIG. 11 confirms the pattern of the light dots in the horizontal direction, and determines the boundary positions of the unit patterns. Specifically, the unit pattern extraction unit 84 reads states of light dots included in a rectangular region corresponding to one or more cycles of the unit patterns in the vertical direction (first direction) and two or more cycles of the unit patterns in the horizontal direction (second direction), on the basis of the image signal of the projection image component. The unit pattern extraction unit 84 counts the number of illuminated dots included in a row of the same length as the length of the unit pattern, in the second direction; searches for a location at which the counted value of the number of illuminated dots is identical with the number of illuminated dots included in a row in the second direction of the unit pattern in all rows; and extracts light dots of a region which has a boundary at this location and has the same size as the unit pattern.

Figure 13A:
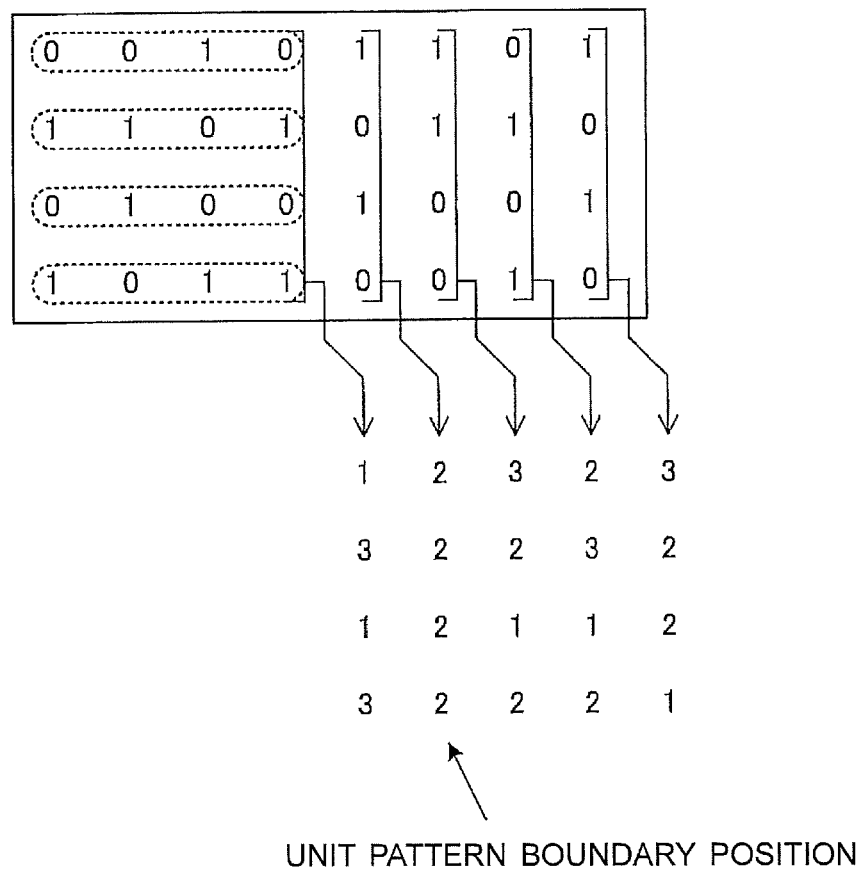
FIGS. 13(*a*) and 13(*b*) are diagrams illustrating a method for determining a boundary position between the unit patterns.
Figure 13B:
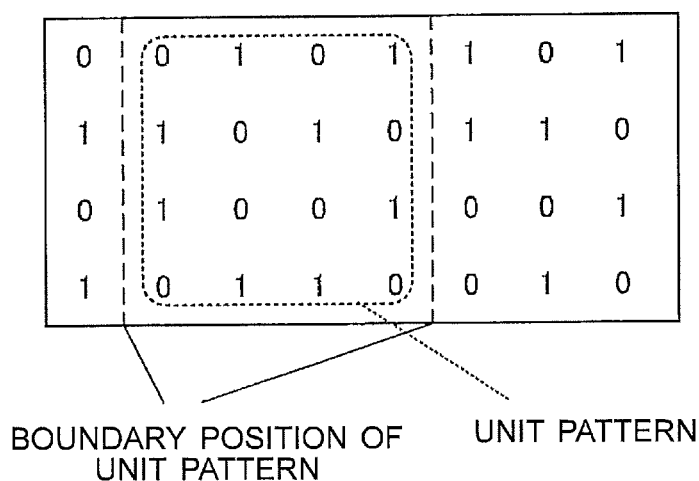

FIGS. 13(a) and 13(b) are diagrams illustrating a method for determining the boundary positions of the unit patterns. FIG. 13(a) illustrates pattern information which is generated by the dot pattern read unit 82 and for which validity confirmation and modification of the pattern information are performed by the pattern validity confirmation unit 83. Here, in order to determine the boundary positions of the unit patterns, it is necessary to read at least the region of one cycle of the unit pattern in the vertical direction and two cycles of the unit pattern in the horizontal direction. Here, the number of dots of the unit pattern is four dots in the vertical direction and four dots in the horizontal direction, and the region of four dots in the vertical direction and eight dots in the horizontal direction is read, in the illustrated case. Moreover, in FIG. 13(a), the digits below the pattern information indicate the results obtained by counting the number of illuminated dots among four dots in the horizontal direction, while a reference position is shifted dot by dot in the horizontal direction.

Detected is a location at which the numbers of illuminated dots in four dots in the horizontal direction are all identical with the predetermined number of illuminated dots (two in the first embodiment) between the boundaries of the unit pattern, over a region corresponding to one cycle of the unit pattern in the vertical direction. In this example, when the column of the second dots from the left of the pattern information is the start position, the illuminated dots in four dots in the horizontal direction are all two dots, and as illustrated in FIG. 13(b), the boundary position of the unit pattern is determined to be between the dot column of the left end of the pattern information and the second dot column from the left, and between of the fifth dot column and the sixth dot column from the left.

Figure 15:
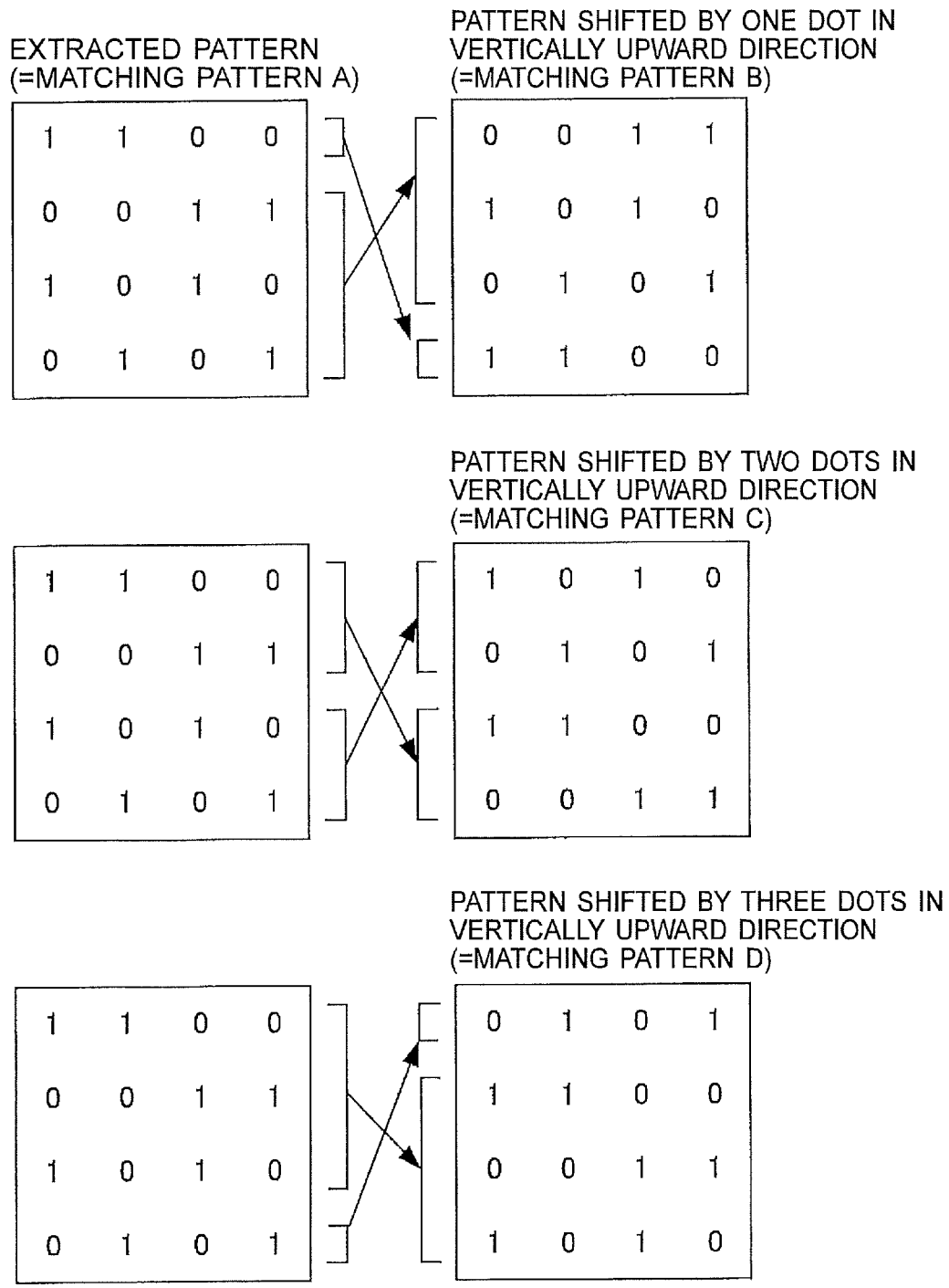
FIG. 15 is an explanatory diagram illustrating a matching method of a pattern extracted in the first embodiment.

FIG. 14 is a diagram illustrating a plurality of reference unit patterns stored in advance in the identification code read unit 85 or the memory unit 86 illustrated in FIG. 11 in association with pattern numbers which are the information for identifying them. The identification code read unit 85 matches the pattern information of the unit pattern extracted by the unit pattern extraction unit 84 with the arrangement information of the reference unit patterns prepared in advance, and determines the pattern number which is the information for identifying the reference unit pattern that is identical with the extracted unit pattern. In other words, the identification code read unit 85 extracts light dots of a region of the same size as the unit pattern, on the basis of the image signal of the projection image component, and determines the identical pattern by matching the pattern obtained by extracting a region of the same length as the unit pattern in the first direction, with the unit patterns included in the entire projection pattern, from the extracted light dot pattern and the pattern obtained by repeatedly locating the extracted light dot pattern in the vertical direction (first direction). For example, the identification code read unit 85 matches the unit pattern extracted by the unit pattern extraction unit 84 with the reference unit patterns illustrated in FIG. 14, and outputs the pattern number of the reference unit pattern that is identical with the extracted unit pattern. In this case, the boundary of the unit pattern in the vertical direction is not identified for the unit pattern extracted by the unit pattern extraction unit 84, and thus it is necessary to perform the matching for four patterns (matching patterns A, B, C, D) obtained by shifting the arrangement of the extracted pattern in the vertical direction, as illustrated in FIG. 15.

The patterns illustrated in FIG. 14 are configured to be not identical with other patterns and the patterns obtained by shifting each pattern in the vertical direction even if shifted in the vertical direction, and thus, as a result of the matching with the four patterns, only one of the four patterns is unfailingly identical with one of the patterns of FIG. 14.

The subsequent process does not require information on which pattern of the four patterns is identical with one of the patterns of FIG. 14, and thus only the pattern number of the identical pattern in FIG. 14 is obtained as a result of processing by the identification code read unit 85.

By performing the matching for the four patterns (matching patterns A, B, C, D) obtained by shifting the arrangement of the pattern extracted in this way in the vertical direction, it is possible to determine the pattern number of the reference unit pattern with which the extracted pattern arrangement, without identifying the boundary of the unit pattern in the vertical direction.

Figure 16:
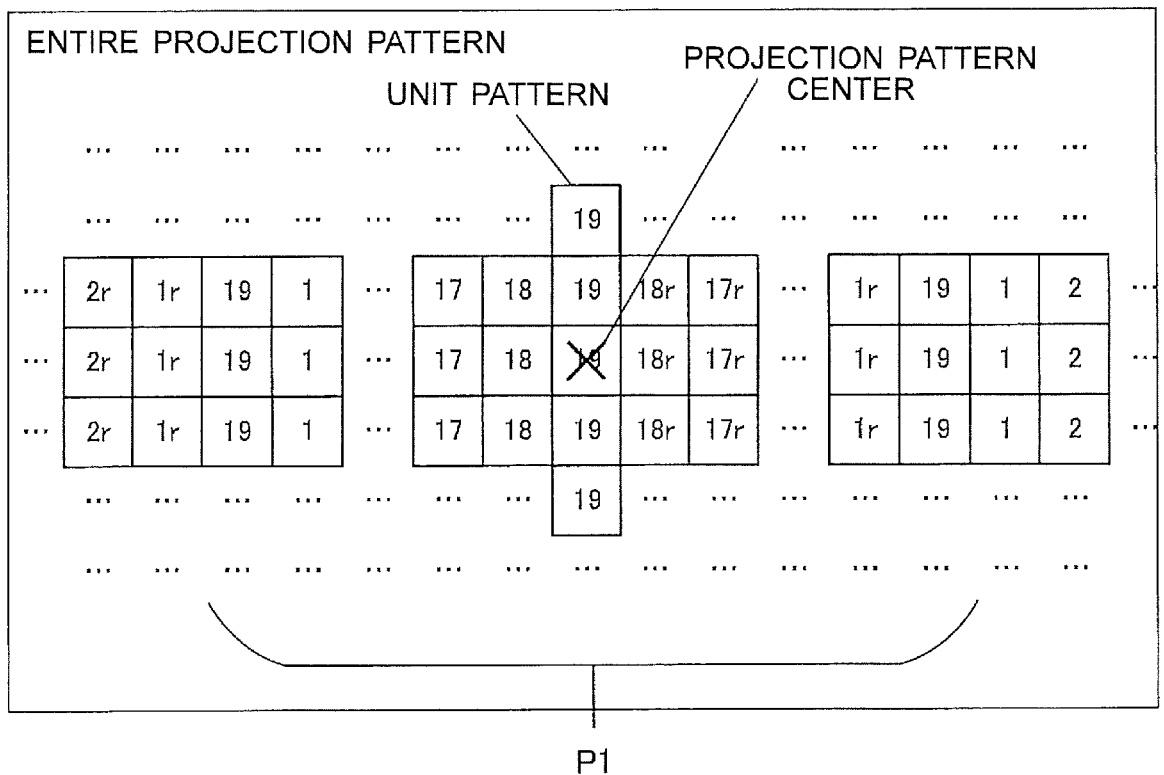
FIG. 16 is a diagram illustrating an arrangement example of the plurality of unit patterns in the projection pattern in the first embodiment.

FIG. 16 is a diagram illustrating an arrangement example of the plurality of unit patterns in the projection pattern in the image generation device according to the first embodiment. As illustrated as a horizontal direction region P1 in FIG. 16, the reference unit patterns illustrated in FIG. 14 satisfy the above projection pattern condition (B3) "when a region of the same number of dots (four dots in the first embodiment) as the unit pattern is cut out at a phase that differs from the cycle of the unit patterns (arrangement cycle) (a boundary position that differs from the boundaries of the unit patterns) in the projection pattern, the number of illuminated dots in the horizontal direction (lateral direction) included in this cut out region differs from the second fixed number (two in the first embodiment) which is the number of illuminated dots included in the unit pattern, in a certain line (row)", by arranging the reference unit patterns in the horizontal direction in the order of the pattern number No. 1 to No. 18, No. 19, No. 18r to No. 1r.

Moreover, as illustrated in FIG. 14, the reference unit patterns No. 1r to No. 18r have the patterns of the light dots obtained by inverting the reference unit patterns No. 1 to No. 18 vertically and horizontally. That is, the reference unit patterns No. 1 to No. 18 and the reference unit patterns No. 1r to No. 18r are point symmetric with respect to a symmetric center at the center of the reference unit pattern. Moreover, the reference unit pattern No. 19 itself is a point symmetric pattern that does not change even when rotated by 180°. Thus, as illustrated in FIG. 16, the entire projection pattern can be configured as a point symmetric pattern that does not change even if rotated by 180° with respect to the pattern center, by arranging the reference unit pattern No. 19 at the center of the entire projection pattern, arranging the unit patterns No. 1 to No. 18 on the left side, and arranging No. 18r to No. 1r on the right side. Furthermore, as illustrated in FIG. 16, the same region as the horizontal direction region P1 may be arranged on the left side and the right side in the horizontal direction of the horizontal direction region P1.

Although in the present invention the projection pattern is projected by the combination of the laser light source and the diffraction grating, the structure of the diffraction grating becomes complicated, and the design cost increases, if a non-point-symmetric pattern is projected by the diffraction grating. Moreover, by complicating the structure of the diffraction grating, the proportion of the zeroth order light that is not diffracted increases, and the strength of the light for projecting the pattern decreases. The above two demerits can be prevented by making the projection pattern point-symmetric.

The effectiveness confirmation unit 87 checks the effectiveness of the identification code read by the identification code read unit 85. When a result of the check indicates that the effectiveness is doubtful (when there is no reliability), the read identification code is not used in subsequent processes.

The projection angle estimation unit 88 obtains information indicating the relationship between the pattern numbers of the unit patterns and the positions in the projection pattern and information indicating the correspondence relationship between the positions in the projection pattern and the projection angles, from the control unit 30, with reference to the pattern numbers determined by the identification code read unit 85, and estimates the projection angle φ of each light dot on the basis of them. Incidentally, the above information, that is, the information indicating the relationship between the pattern numbers of the unit patterns and the positions in the projection pattern and the information indicating the correspondence relationship between the positions in the projection pattern and the projection angles may be retained in a memory in the projection angle estimation unit 88, when supplied from the control unit 30.

The incident angle estimation unit 89 calculates which position in the imaging surface the light dot included in the unit pattern is captured at, on the basis of the output of the unit pattern extraction unit 84, and the incident angle θ of the light dot on the basis of the axis line direction and the view angle of the imaging unit 11. The information Szv indicating the axis line direction and the view angle is retained by the control unit 30 in advance and is supplied from the control unit 30.

The distance calculation unit 90 calculates the distance to the surface of the object where the light dot is projected, on the basis of the projection angle φ estimated by the projection angle estimation unit 88, the incident angle θ calculated by the incident angle estimation unit 89, and the base line length Lpc supplied from the control unit 30.

In FIG. 3, the following equation (1) is established.

$$Z \cdot \tan \varphi - Z \cdot \tan \theta = Lpc \qquad \text{Equation (1)}$$

From equation (1), the distance Z from the base line BL of FIG. 3 to the object surface on which the light dot is projected (the point at which the light dot SP is formed), that is, the position of the light dot SP in FIG. 3 is expressed by the following equation (2).

$$Z = Lpc/(\tan \varphi - \tan \theta) \qquad \text{Equation (2)}$$

Next, the distance R from the imaging unit 11 to the object surface (light dot SP) on which the light dot is formed can be calculated by the following equation (3), from the distance Z to the base line BL obtained by equation (2) and the incident angle θ.

$$R = Z/\cos \theta \qquad \text{Equation (3)}$$

As described above, according to the first embodiment, the number of illuminated dots included in the width (four dots in the first embodiment) of the unit pattern in the vertical direction is set to a fixed number at an arbitrary position, and thus even if an illuminated dot is lost or noise is erroneously detected as an illuminated dot, the validity of the pattern information can be determined from the patterned arrangement of the light dots in the vertical direction, and the pattern of the light dots can be modified. Thus, the accurate distance information to the object can be acquired.

Moreover, the number of illuminated dots included in the width (four dots in the first embodiment) of the unit pattern in the horizontal direction becomes the constant number (second fixed number) in all lines only at the boundary position of the unit pattern, and thus the boundary of the unit pattern can be estimated from the pattern arrangement and the unit pattern can be identified, without providing a distinct pattern boundary identification code. Thus, the unit patterns can be identified accurately, and the accurate distance information to the object can be acquired.

Moreover, by making the entire projection pattern a point symmetric pattern that is identical with the original pattern even if rotated by 180° with respect to its center, the structure of the diffraction grating for the pattern projection can be prevented from being complicated, the production cost can be reduced, and reduction in the zeroth order light makes it possible to increase the light strength of the projection pattern.

Further, according to the image generation device of the first embodiment, a plurality of unit patterns that are distinguishable from each other are arranged in the horizontal direction, and thus the projection angle of the light beam that forms the unit pattern can be identified from the arrangement of the illuminated dots in the unit pattern. Hence, it is not necessary to estimate the projection angle of each of the light dots in the captured image, by the pattern matching, and the computation amount can be reduced significantly.

Moreover, as illustrated in FIG. 16, by making the entire projection pattern a point symmetric pattern with respect to its center (No. 19), the structure of the diffraction grating for the pattern projection can be prevented from being complicated, the production cost can be reduced, and reduction in the zeroth order light transmitted without diffraction makes it possible to increase the projection pattern light strength by the diffracted light.

The above description has illustrated a case in which the unit pattern has a size of four dots in the horizontal direction and four dots in the vertical direction. However, the size of the illustrated unit pattern is an example, and the unit pattern can be set to have an arbitrary size. For the purpose of object distance measurement, it is necessary to create at least about ten types of unique unit patterns that satisfy the above projection pattern conditions (B1) to (B5) and are not identical with each other. Hence, the minimum size of a desirable unit pattern is four dots in the horizontal direction and four dots in the vertical direction.

Moreover, by making the size of the unit pattern smaller, the number of dots necessary for the pattern identification can be reduced, and the minimum value of the size of the object for which the distance is measurable can be made smaller.

Furthermore, although the above description illustrates a configuration that uses the diffraction grating as an element for forming the pattern light L22, a light dispersion device of the projection pattern, such as a transmissive computer hologram (computer generated hologram) can be used, instead of the configuration that uses the diffraction grating. This computer hologram is described in patent reference 4 (Japanese Patent Application Publication No. 2007-17643) etc., for example.

Second Embodiment

An image generation device according to a second embodiment differs from the image generation device according to the first embodiment, in that a plurality of unit patterns composing a projection pattern formed by the pattern light emitted from the projection unit 22 are each set to a size of six dots in the horizontal direction (second direction) and four dots in the vertical direction (first direction). The image generation device according to the second embodiment has the same configuration as the configuration illustrated in FIGS. 1 and 11. Thus, in the explanation of the second embodiment, FIGS. 1 and 11 are also referred to.

Figure 17:
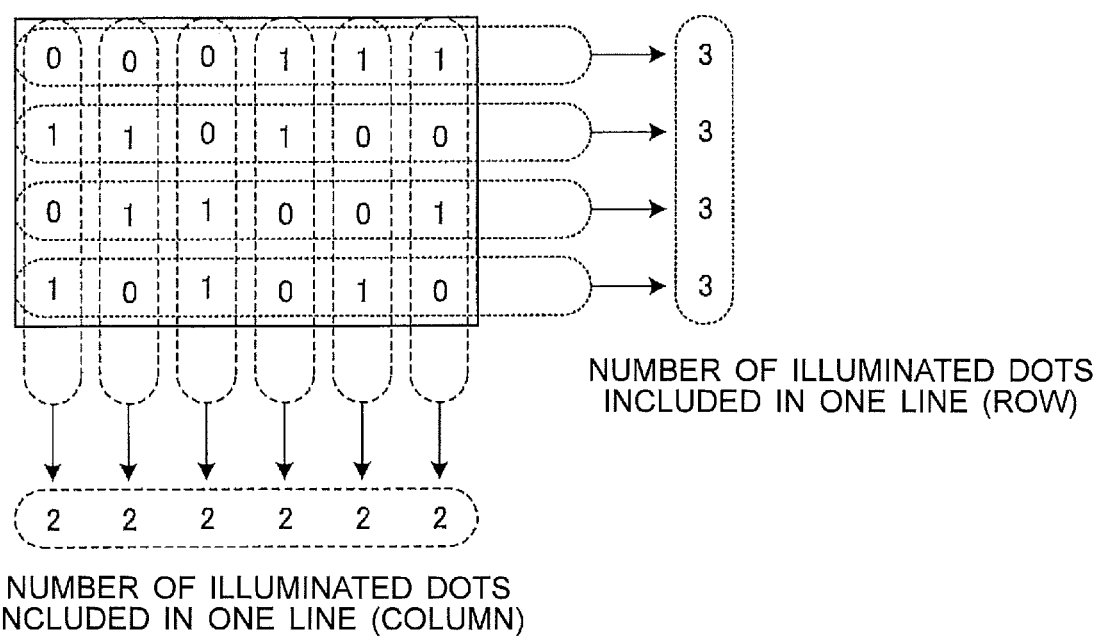
FIG. 17 is a diagram illustrating the number of illuminated dots included in one unit pattern in a projection pattern in a second embodiment of the present invention, with respect to each row (horizontal line) and each column (vertical line).

FIG. 17 is a diagram illustrating the number of illuminated dots included in one unit pattern in the projection pattern in the image generation device according to the second embodiment, with respect to each row (horizontal line) and each column (vertical line). As illustrated in FIG. 17, in the second embodiment, the unit pattern is set such that the number of illuminated dots included in one line (row) in the horizontal direction is three, and the number of illuminated dots included in one line (column) in the vertical direction is two, in the unit pattern of six dots in the horizontal direction and four dots in the vertical direction (i.e., six dots×four dots).

Figure 18:
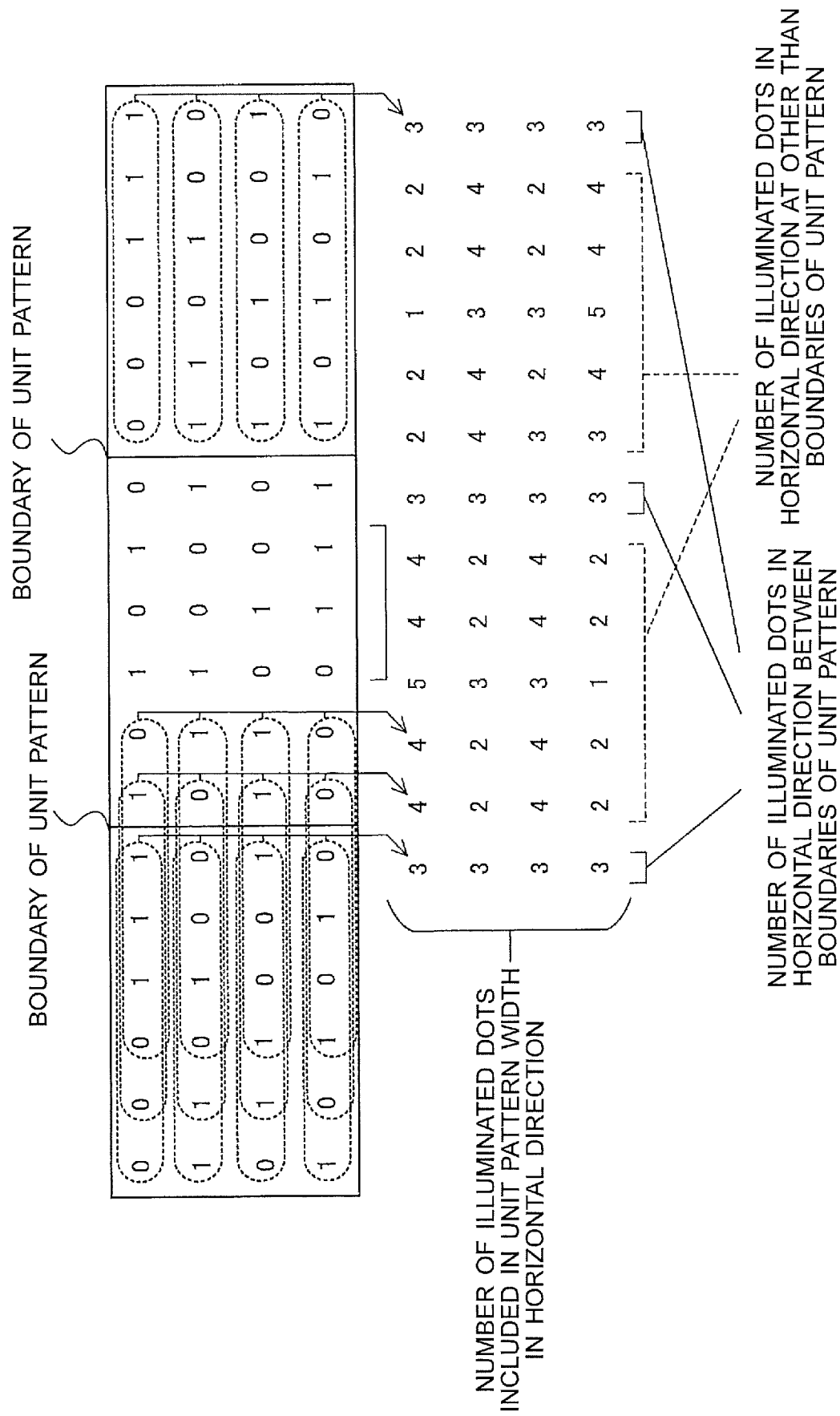
FIG. 18 is a diagram illustrating a condition to be satisfied when a plurality of unit patterns in the projection pattern in the second embodiment are arranged in the horizontal direction.

FIG. 18 is a diagram illustrating the conditions to be satisfied when a plurality of unit patterns in the projection pattern in the image generation device according to the second embodiment are arranged in the horizontal direction. FIG. 18 illustrates a case in which three unit patterns are arranged in the horizontal direction. FIG. 18 illustrates the number of illuminated dots among six dots in the horizontal direction at each position in the horizontal direction, below the three unit patterns. The unit pattern is determined such that the number of illuminated dots between the boundaries of the unit pattern is a constant number (three in the example of FIG. 18). Moreover, a combination of the unit patterns is determined such that, when the number of illuminated dots among six dots in the horizontal direction is counted at a location other than the boundaries of the unit patterns, the counted value (the number of illuminated dots) in at least one line (row) among the counted values of four lines (rows) differs from the constant value (three in the example of FIG. 18) which is the number of illuminated dots between the boundaries of the unit pattern. Here, it is desirable that the number of illuminated dots at a location other than the boundaries of the unit patterns differ from the constant value (three in the example of FIG. 18) which is the number of illuminated dots between the boundaries of the unit pattern, in as many lines (rows) as possible. This is because errors in identifying the position of the unit pattern can be reduced much more, when the projection pattern conditions (B1) to (B5) are satisfied at the time of reading the pattern of the light dots.

Figure 19:
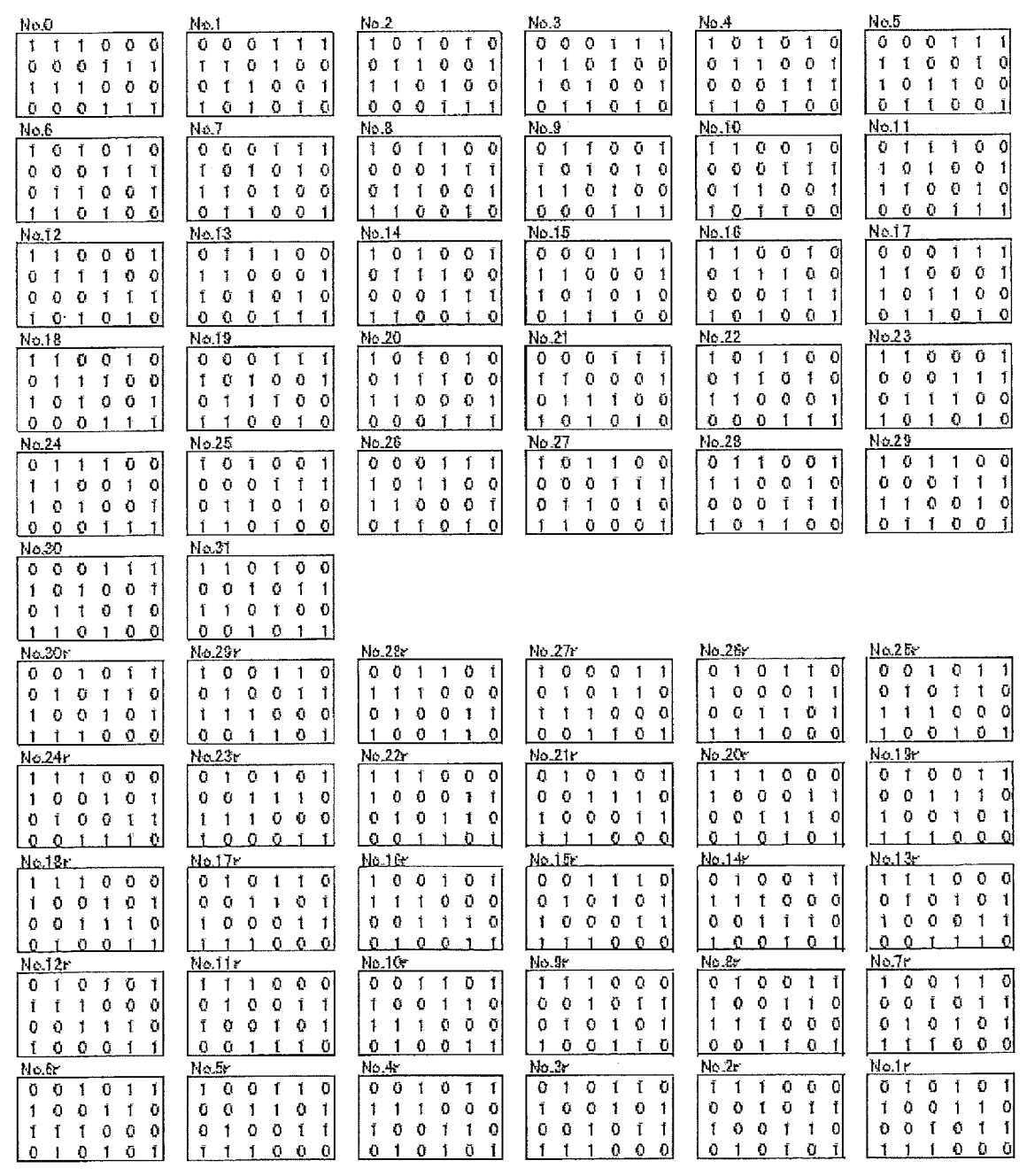

FIG. 19 is a diagram illustrating a plurality of reference unit patterns stored in advance in the identification code read unit (85 of FIG. 11) or the memory unit (86 of FIG. 11) of the image generation device according to the second embodiment in association with pattern numbers which are the information for identifying them. The identification code read unit 85 matches the pattern information of the unit pattern extracted by the unit pattern extraction unit 84 with the arrangement information of the reference unit patterns prepared in advance, and determines the pattern number of the reference unit pattern that is identical with the extracted unit pattern.

Figure 20:
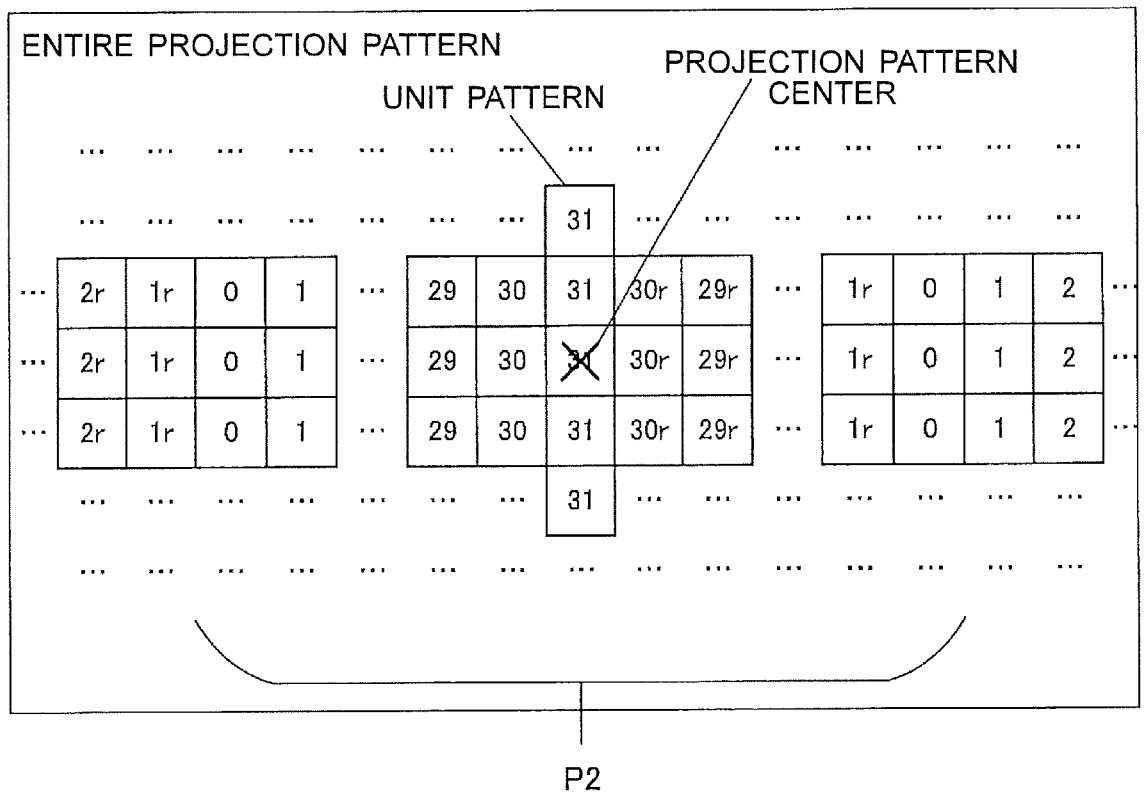
FIG. 20 is a diagram illustrating an arrangement example of the plurality of unit patterns in the projection pattern in the second embodiment.

FIG. 20 is a diagram illustrating an arrangement example of the plurality of unit patterns in the projection pattern in the image generation device according to the second embodiment. As illustrated as a horizontal direction region P2 in FIG. 20, the reference unit patterns of FIG. 19 are arranged in the horizontal direction in the order of the pattern number No. 0, No. 1 to No. 30, No. 31, No. 30r to No. 1r, No. 0, and thereby "the counted value of illuminated dots in at least one line (row) among the counted values of illuminated dots in four lines (rows) differs from the number of illuminated dots between the boundaries of the unit pattern" is satisfied. In other words, the projection pattern condition (B3) "when a region of the same number of dots as the unit pattern is cut out at a phase that differs from the cycle of the unit patterns (arrangement cycle) (a position that differs from the boundaries of the unit patterns) in the projection pattern, the number of illuminated dots in the horizontal direction (lateral direction) included in this cut out region differs from the second fixed number which is the number of illuminated dots included in the unit pattern, in a certain line (row)" is satisfied.

Moreover, as illustrated in FIG. 19, the reference unit patterns No. 1r to No. 30r have the patterns of light dots obtained by inverting the reference unit patterns No. 1 to No. 30 vertically and horizontally. That is, the reference unit patterns No. 1 to No. 30 and the reference unit patterns No. 1r to No. 30r are point symmetric with respect to a symmetric center at the center of the reference unit pattern. Moreover, each of the reference unit patterns No. 0 and No. 31 has a pattern of light dots that does not change even if rotated by 180°. Thus, as illustrated in FIG. 20, the entire projection pattern can be configured as a point symmetric pattern that does not change even if rotated by 180° with respect to a center at the unit pattern No. 31, by arranging the unit pattern No. 31 at the center of the entire projection pattern, arranging the unit patterns No. 0, No. 1 to No. 30 on the left side of the unit pattern No. 31, and arranging the unit patterns No. 30r to No. 1r, No. 0 on the right side of the unit pattern No. 31.

Although in the first embodiment the size of the unit pattern is four dots in the horizontal direction and four dots in the vertical direction, by enlarging the size of the unit pattern to six dots in the horizontal direction and four dots in the vertical direction as in the second embodiment, types of unique unit patterns that can be arranged in the horizontal direction can be increased. The types of identifiable unit patterns increase by enlarging the size of the unit pattern, and therefore the object angle can be calculated within a wider angle range. Note that, as illustrated in FIG. 20, the same region as the horizontal direction region P2 may be arranged in the left side and the right side of the horizontal direction region P2 in the horizontal direction.

Moreover, when the size of the unit pattern is made larger, the size of the object necessary for identifying the patterns is enlarged, and the position of a small object cannot be measured. Hence, it is necessary to select an appropriate size of the unit pattern according to the size of the object and the range of the measurement distance which are assumed in a system that employs the present technology.

As described above, according to the image generation device of the second embodiment, the number of illuminated dots included in the width (four dots) of the unit pattern in the vertical direction (first direction) is set to the first fixed number (two), and thus even when an illuminated dot (first dot) is lost or even when noise is erroneously detected as an illuminated dot, the validity of the pattern information can be determined from the arrangement of the light dots in the vertical direction, and the error of the light dot can be modified. Thus, even when the object is far from the image generation device, the accurate distance information to the object can be acquired.

Moreover, according to the image generation device of the second embodiment, the counted value becomes the second fixed number (three) in all lines (rows), only when the number of illuminated dots included in the width (six dots) of the unit pattern in the horizontal direction (second direction) is counted between the boundaries of the unit pattern. Hence, the boundaries in the horizontal direction of the unit patterns can be estimated from the arrangement of the light dots and the unit pattern can be identified, without providing a distinct pattern boundary identification code. Thus, the unit patterns can be identified accurately, and the accurate distance information to the object can be acquired.

Further, according to the image generation device of the second embodiment, a plurality of unit patterns that are distinguishable from each other are arranged in the horizontal direction, and thus the projection angle of the light beam that forms the unit pattern can be identified from the arrangement of the illuminated dots in the unit pattern. Hence, it is not necessary to estimate the projection angle of each of the light dots in the captured image, by the pattern matching, and the computation amount can be reduced significantly.

Moreover, as illustrated in FIG. 20, the entire projection pattern is a point symmetric pattern with respect to a symmetric center at the center (reference unit pattern No. 31), thereby the structure of the diffraction grating for projecting the pattern light can be prevented from being complicated, and the production cost can be reduced. Moreover, reduction in the zeroth order light transmitted without diffraction makes it possible to increase the strength of the projection pattern light which is the diffracted light.

Third Embodiment

Figure 21:
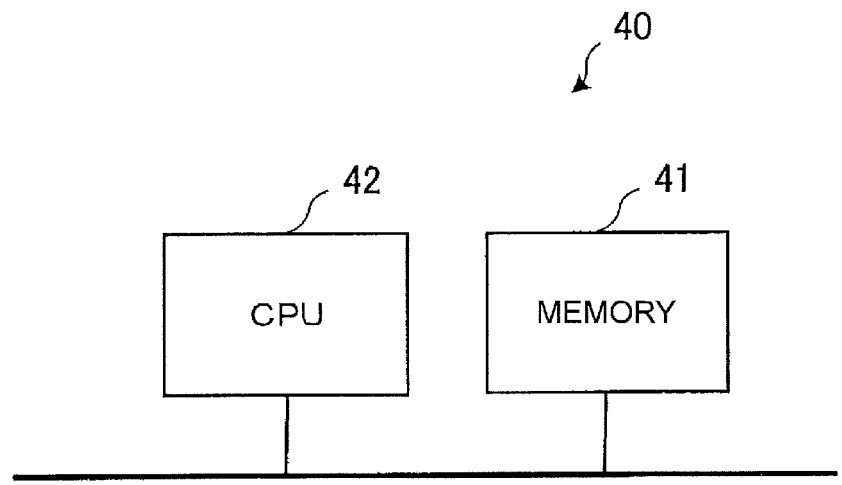
FIG. 21 is a hardware configuration diagram illustrating an image generation device according to a third embodiment of the present invention.

FIG. 21 is a hardware configuration diagram illustrating an image generation device according to a third embodiment of the present invention. The separation unit 16, the image generation unit 17, the distance information generation unit 18, the display processing unit 19, and the control unit 30 in the image generation devices according to the first and second embodiments can be configured with a processing circuit, such as an integrated circuit. Moreover, the separation unit 16, the image generation unit 17, the distance information generation unit 18, the display processing unit 19, and the control unit 30 can be implemented by a processing device 40. The processing device 40 can be composed of a memory 41 and a CPU (Central Processing Unit) 42 that can execute a program stored in the memory 41. The CPU 42 is also referred to as a central processing unit, a computing device, a microprocessor, a microcomputer, a processor, or a DSP (Digital Signal Processor). The memory 41 is a non-volatile or volatile semiconductor memory, such as a RAM (Random Access Memory), a ROM (Read Only Memory), a flash memory, an EPROM (Erasable Programmable Read Only Memory) and an EEPROM (Electrically Erasable Programmable Read-Only Memory), or the memory 41 is a magnetic disk, a flexible disc, an optical disc, a compact disc, a mini disc, a DVD (Digital Versatile Disc) or the like, for example. Moreover, the processing device 40 can be configured with software, firmware, or a combination of software and firmware. The software and the firmware can be described as a program, and be stored in the memory 41. The image generation device according to the third embodiment operates in the same manner as the image generation device according to the first or second embodiment, and can obtain the same effect.

VARIANT EXAMPLE

The image generation devices according to the first to third embodiments can be applied to a video capturing device, such as a video camera. The video capturing device to which the image generation device according to the first to third embodiments is applied can output a video signal and the distance information to each position associated with the video.

Moreover, the image generation devices according to the first to third embodiments can be applied to a video display device, such as a television. The video display device to which the image generation device according to the first to third embodiments is applied can display the video signal and the distance information to each position associated with the video, on a display screen.

Moreover, the image generation devices according to the first to third embodiments can be applied to a video recording and reproducing device, such as a video recorder. The video recording and reproducing device to which the image generation device according to the first to third embodiments is applied is capable of recording the video signal and the distance information to each position associated with the video in a record medium, and reading them from the record medium to reproduce them.

Moreover, any one of the video capturing device, the video display device, and the video recording and reproducing device to which the image generation device according to the first to third embodiments is applied can be applied to a monitoring system.

Further, the image generation devices according to the first to third embodiments can be applied to driving support based on obstacle detection in front of and behind a vehicle, for example, parking support for a vehicle.

DESCRIPTION OF REFERENCE CHARACTERS 10 image acquisition unit; 11 imaging unit; 12 lens; 14 image sensor; 15 A/D conversion unit; 16 separation unit; 17 image generation unit; 18 distance information generation unit; 19 display processing unit; 20 pattern light generation unit; 21 drive unit; 22 projection unit; 23 laser light source; 24 collimator lens; 25 aperture; 26 diffraction grating; 30 control unit; 30a memory unit; 61 frame delay unit; 62 difference computation unit; 63 switch; 81 binarization unit; dot pattern read unit; 83 pattern validity confirmation unit; 84 unit pattern extraction unit; 85 identification code read unit; 86 memory unit; 87 effectiveness confirmation unit; 88 projection angle estimation unit; 89 incident angle estimation unit; 90 distance calculation unit.

What is claimed is:
1. An image generation device comprising:
an imaging unit configured to generate an imaging signal by capturing an image of an imaging space;
a projection unit configured to form a projection pattern as a projection image on an object that exists in the imaging space, by projecting pattern light toward the imaging space;
a separation unit configured to generate an image signal of a background component that does not include a component of the projection pattern and an image signal of a projection image component, from a first imaging signal generated when the pattern light is not projected and a second imaging signal generated when the pattern light is projected; and
a distance information generation unit configured to store in advance a relationship between a position of each of light dots in the projection pattern and a projection angle, and generate distance information indicating a distance to the object on which the light dots are projected, by identifying a projection angle of each of light dots in the projection pattern captured by the imaging unit on a basis of the relationship between the position of each of the light dots in the projection pattern and the projection angle and the image signal of the projection image component and calculating the distance on a basis of the identified projection angles;
wherein the projection pattern includes a plurality of unit patterns arranged in a plurality of rows in a first direction and a plurality of columns in a second direction orthogonal to the first direction,
the plurality of light dots include first dots and second dots, and the first dots and the second dots are light dots in different states from each other,
the plurality of unit patterns arranged in the first direction have light dot arrangements identical with each other,
the plurality of unit patterns arranged in the second direction have light dot arrangements different from each other,
in each of the plurality of unit patterns, a number of the first dots among a plurality of light dots arranged in the first direction is a fixed number that is a same number in each row in the second direction, and in a location other than the unit pattern, a number of the first dots included in a row of a same length as the unit pattern in the second direction differs from the fixed number, in a certain row in the second direction.

2. The image generation device according to claim 1, wherein:
the first dot is an illuminated dot as the light dot at a position formed by being irradiated with a light beam emitted from the projection unit, and
the second dot is a non-illuminated dot as the light dot at a position which is not irradiated with the light beam.

3. The image generation device according to claim 1, wherein:
the distance information generation unit includes a pattern validity confirmation unit, and
the pattern validity confirmation unit
reads light dots in a rectangular region of a size corresponding to two or more cycles of the unit pattern in each of the first direction and the second direction, on a basis of the image signal of the projection image component generated by the separation unit, and
determines whether or not a condition that states of light dots of positions separated by a distance of a length of the unit pattern in the first direction are identical with each other, and a condition that a number of the first dots included in a column of a same length as the unit pattern in the first direction is same as a number of the first dots included in a column of the unit pattern in the first direction, are satisfied.

4. The image generation device according to claim 1, wherein:
the distance information generation unit includes a unit pattern extraction unit, and
the unit pattern extraction unit
reads states of light dots included in a rectangular region corresponding to one or more cycles of the unit pattern in the first direction and two or more cycles of the unit pattern in the second direction, on a basis of the image signal of the projection image component generated by the separation unit, and
counts a number of the first dots included in a row of a same length as the unit pattern in the second direction, searches for a location at which a counted value of the number of the first dots is same in all rows as the number of the first dots included in a row in the second direction of the unit pattern, and extracts light dots in a region which has a boundary at the location and has a same size as the unit pattern.

5. The image generation device according to claim 1, wherein:
the distance information generation unit includes an identification code read unit, and
the identification code read unit
extracts light dots in a region of a same size as the unit pattern, on a basis of the image signal of the projection image component generated by the separation unit, and
determines an identical pattern by performing matching between a pattern obtained by extracting a region of a same length as the unit pattern in the first direction and the unit patterns included in the entire projection pattern, from a pattern of the extracted light dots and a pattern obtained by repeatedly locating in the first direction the pattern of the extracted light dots.

6. The image generation device according to claim 1, wherein:
an arrangement of the light dots included in the entire projection pattern is determined to be point symmetric with respect to a symmetry center at a center position of the entire projection pattern, and
the plurality of unit patterns included in the projection pattern include a pair of a first unit pattern and a second unit pattern obtained by rotating the first unit pattern by 180° with respect to a center at a center position of the first unit pattern.

7. The image generation device according to claim 1, wherein:
the unit pattern includes light dots of four rows in the first direction and four columns in the second direction,
a number of the first dots arranged in the first direction included in the unit pattern is two, and
a number of the first dots arranged in the second direction included in the unit pattern is two.

8. The image generation device according to claim 1, wherein:
the unit pattern includes light dots of four rows in the first direction and six columns in the second direction,
a number of the first dots arranged in the first direction included in the unit pattern is two, and
a number of the first dots arranged in the second direction included in the unit pattern is three.

9. An image generating method comprising:
a step of forming a projection pattern as a projection image on an object that exists in an imaging space, by projecting pattern light toward the imaging space;
a step of generating an imaging signal by capturing an image of the imaging space;
a step of generating an image signal of a background component that does not include a component of the projection pattern and an image signal of a projection image component, from a first imaging signal generated when the pattern light is not projected and a second imaging signal generated when the pattern light is projected; and
a step of identifying a projection angle of each of light dots in the captured projection pattern on a basis of a relationship between a position of each of light dots in the projection pattern and a projection angle that is stored in advance and the image signal of the projection image component, calculating a distance to the object on which the light dots are projected on a basis of the identified projection angles, and thereby generating distance information indicating the distance;
wherein the projection pattern includes a plurality of unit patterns arranged in a plurality of rows in a first direction and a plurality of columns in a second direction orthogonal to the first direction,
the plurality of light dots include first dots and second dots, and the first dots and the second dots are light dots in different states from each other,
the plurality of unit patterns arranged in the first direction have light dot arrangements identical with each other,
the plurality of unit patterns arranged in the second direction have light dot arrangements different from each other,
in each of the plurality of unit patterns, a number of the first dots among a plurality of light dots arranged in the first direction is a fixed number that is a same number in each row in the second direction, and
in a location other than the unit pattern, a number of the first dots included in a row of a same length as the unit pattern in the second direction differs from the fixed number, in a certain row in the second direction.

10. A pattern light generation device comprising:
a projection unit configured to generate and project pattern light including predetermined light dot patterns from light emitted from a light source, and thereby form a projection pattern as a projection image on an object; and
a drive unit configured to drive the light source;
wherein the projection pattern includes a plurality of unit patterns arranged in a plurality of rows in a first direction and a plurality of columns in a second direction orthogonal to the first direction,
the plurality of light dots include first dots and second dots, and the first dots and the second dots are light dots in different states from each other,
the plurality of unit patterns arranged in the first direction have light dot arrangements identical with each other,
the plurality of unit patterns arranged in the second direction have light dot arrangements different from each other,
in each of the plurality of unit patterns, a number of the first dots among a plurality of light dots arranged in the first direction is a fixed number that is a same number in each row in the second direction, and
in a location other than the unit pattern, a number of the first dots included in a row of a same length as the unit pattern in the second direction differs from the fixed number, in a certain row in the second direction.

* * * * *